US012701519B2

(12) United States Patent
Abedini et al.

(10) Patent No.: US 12,701,519 B2
(45) Date of Patent: Aug. 4, 2026

(54) REPEATER POWER MANAGEMENT FOR POSITIONING

(71) Applicant: QUALCOMM Incorporated, San Diego, CA (US)

(72) Inventors: Navid Abedini, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 18/183,064

(22) Filed: Mar. 13, 2023

(65) Prior Publication Data

US 2024/0314708 A1    Sep. 19, 2024

(51) Int. Cl.
| | |
|---|---|
| *H04W 52/14* | (2009.01) |
| *H04B 7/155* | (2006.01) |
| *H04W 52/24* | (2009.01) |
| *H04W 52/32* | (2009.01) |
| *H04W 52/46* | (2009.01) |

(52) U.S. Cl.
CPC ......... *H04W 52/46* (2013.01); *H04W 52/245* (2013.01)

(58) Field of Classification Search
None
See application file for complete search history.

(56) References Cited

U.S. PATENT DOCUMENTS

| | | | | |
|---|---|---|---|---|
| 2015/0117403 A1* | 4/2015 | Kubota | ................... | H04W 8/02 |
| | | | | 370/331 |
| 2017/0202028 A1* | 7/2017 | Gaal | ................. | H04W 74/0833 |

| | | | | |
|---|---|---|---|---|
| 2019/0132042 A1* | 5/2019 | Tachigi | .............. | H04B 7/15507 |
| 2020/0296680 A1* | 9/2020 | Akkarakaran | ........ | G01S 5/0273 |
| 2022/0232513 A1 | 7/2022 | Akkarakaran et al. | | |
| 2022/0322035 A1* | 10/2022 | Fakoorian | ................. | G01S 5/08 |
| 2022/0369309 A1* | 11/2022 | Li | ..................... | H04W 72/0446 |
| 2023/0179294 A1* | 6/2023 | Kuang | .............. | H04B 7/18541 |
| | | | | 370/316 |

(Continued)

FOREIGN PATENT DOCUMENTS

| | | | | | |
|---|---|---|---|---|---|
| CN | 113170400 A | * | 7/2021 | ........... | H04B 17/328 |
| CN | 115150881 A | * | 10/2022 | .............. | G01S 5/06 |

(Continued)

OTHER PUBLICATIONS

International Search Report and Written Opinion—PCT/US2024/015642—ISA/EPO—Jun. 11, 2024.

*Primary Examiner* — Mohammed Rachedine
(74) *Attorney, Agent, or Firm* — QUALCOMM Incorporated

(57)                    ABSTRACT

Apparatuses and methods for repeater power management for positioning are described. An apparatus is configured to receive a DL transmission(s) at a reception power level. The DL transmission(s) is associated with an initial transmission power level including an initial power characteristic(s) that is different from a repeater power characteristic(s) of a repeater transmission power level associated with the DL transmission(s). The initial transmission power level and the repeater transmission power level are associated with communication for a positioning session. The apparatus is also configured to obtain an indication of the repeater power characteristic(s) of the repeater transmission power level.

30 Claims, 13 Drawing Sheets

(56)                    References Cited

U.S. PATENT DOCUMENTS

| | | | | |
|---|---|---|---|---|
| 2023/0196902 A1* | 6/2023 | Miyake | .................. | H04W 4/90 |
| | | | | 340/539.1 |
| 2025/0056430 A1* | 2/2025 | Echigo | ................. | H04W 52/46 |

FOREIGN PATENT DOCUMENTS

| | | | | | |
|---|---|---|---|---|---|
| CN | 119998676 A | * | 5/2025 | ............ | H04W 72/02 |
| WO | WO-2023119534 A1 | * | 6/2023 | ............ | H04W 52/46 |

* cited by examiner $\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

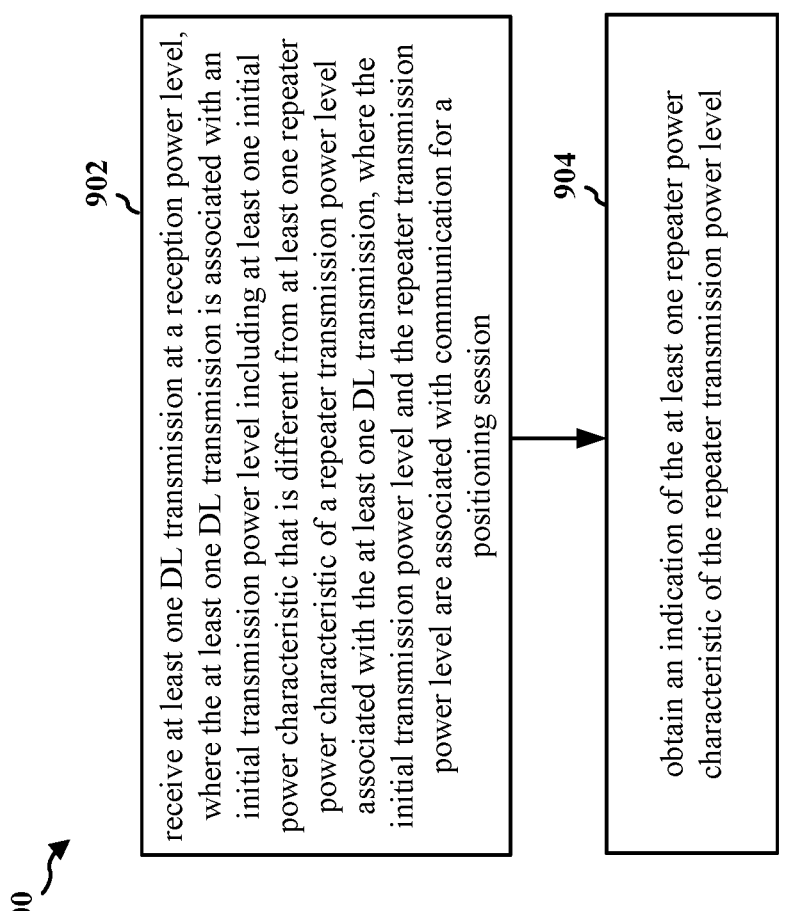

902 receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session

904 obtain an indication of the at least one repeater power characteristic of the repeater transmission power level

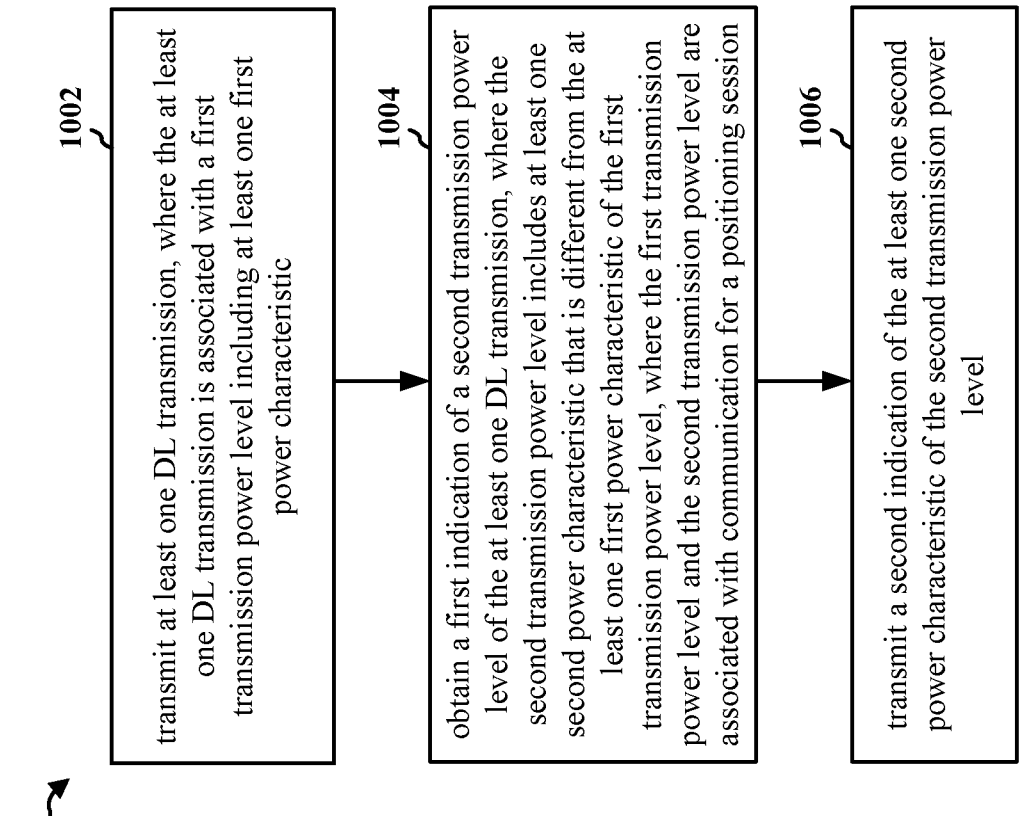

1000

1002 transmit at least one DL transmission, where the at least one DL transmission is associated with a first transmission power level including at least one first power characteristic

1004 obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session

1006 transmit a second indication of the at least one second power characteristic of the second transmission power level

FIG. 10

REPEATER POWER MANAGEMENT FOR POSITIONING

TECHNICAL FIELD

The present disclosure relates generally to communication systems, and more particularly, to wireless communications utilizing positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to receive at least one downlink (DL) transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The apparatus is also configured to obtain an indication of the at least one repeater power characteristic of the repeater transmission power level.

In the aspect, the method includes receiving at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The method also includes obtaining an indication of the at least one repeater power characteristic of the repeater transmission power level.

In another aspect of the disclosure, a method, a computer-readable medium, and an apparatus are provided. The apparatus is configured to transmit at least one DL transmission, where the at least one DL transmission is associated with a first transmission power level including at least one first power characteristic. The apparatus is also configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The apparatus is further configured to transmit a second indication of the at least one second power characteristic of the second transmission power level.

In the aspect, the method includes transmitting at least one DL transmission, where the at least one DL transmission is associated with a first transmission power level including at least one first power characteristic. The method also includes obtaining a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The method further includes transmitting a second indication of the at least one second power characteristic of the second transmission power level.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication, in accordance with various aspects of the present disclosure.

FIG. 10 is a flowchart of a method of wireless communication, in accordance with various aspects of the present disclosure.

DETAILED DESCRIPTION

Figure 1:
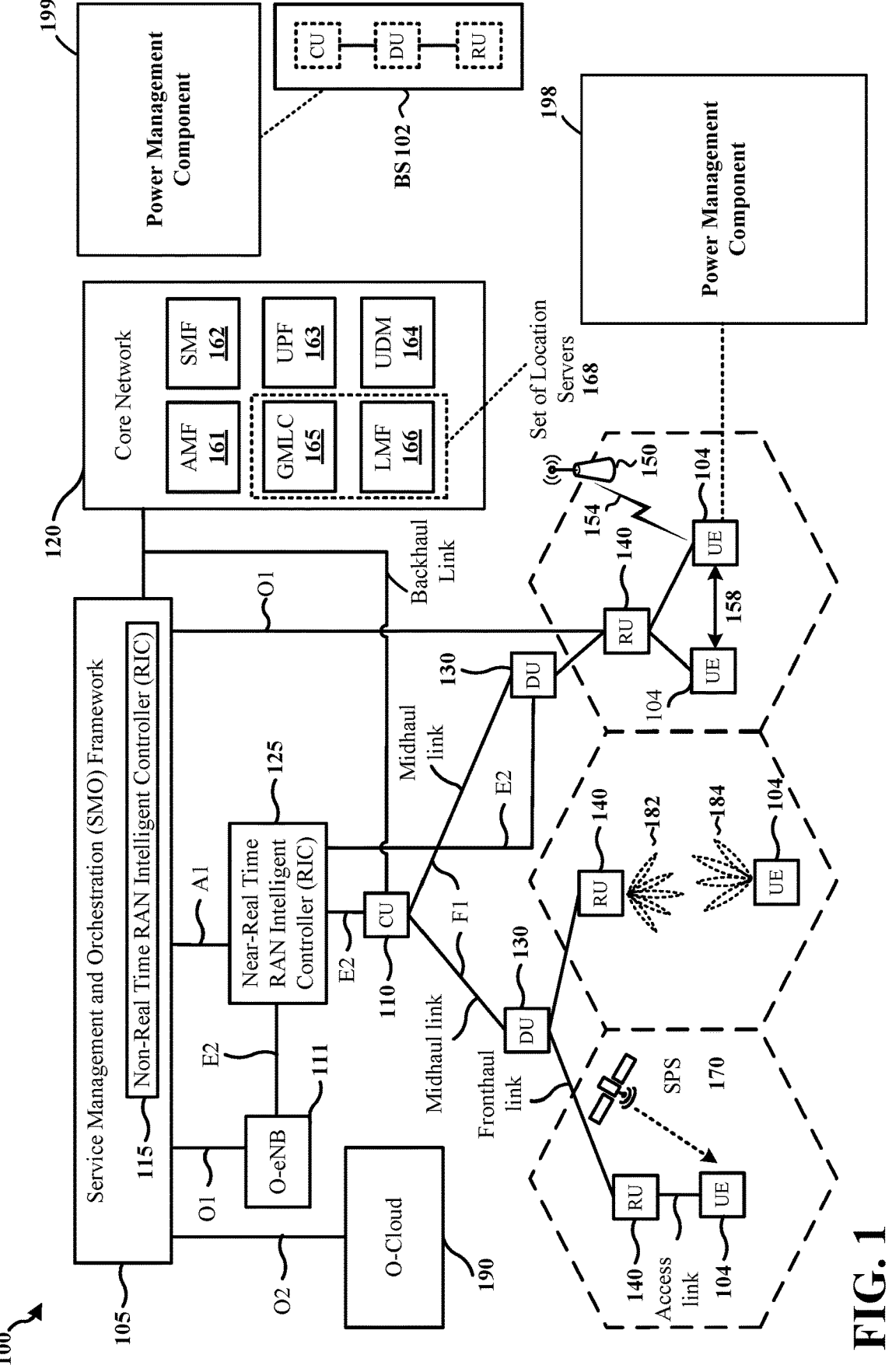
FIG. 1 is a diagram illustrating an example of a wireless communications system and an access network.

Wireless communication networks, such as a 5G NR network, may enable positioning measurements and operations for wireless devices. For instance, a wireless communication network and/or a wireless device may utilize measurements associated with specific signaling to enable the determination of one or more angles of arrival, power levels of transmitted/received signals, etc., utilized for positioning operations. As one example, a network node, such as a base station, may provide DL signaling for a wireless device, such as a UE, which may respond with corresponding UL signaling that indicates the one or more angles of arrival, the power levels of transmitted/received signals, etc. Based on the received signaling, the network node, or a network entity, such as a location management function (LMF), may perform operations to determine positioning of the wireless device.

However, scenarios may arise in which such signaling may not be adequate to determine an accurate positioning determination for the wireless device. For instance, a network node may communicate/exchange with a wireless device via a repeater. A repeater (e.g., a network-controlled repeater (NCR)) may be used to receive/forward positioning references for positioning of a wireless device. In some cases, such a repeater may forward DL/UL signaling between a network node and a wireless device (e.g., with no or minimal processing), and the network node is thus the logical source/destination of DL/UL signaling with respect to the wireless device. Yet, the positioning and transmission characteristics of the repeater, e.g., for transmission power levels, should be considered as the repeater is the physical source/destination for positioning purposes, in such scenarios.

Various aspects relate generally to positioning systems. Some aspects more specifically relate to repeater power management for positioning. In some examples, a wireless device may be configured to receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The wireless device may also be configured to obtain an indication of the at least one repeater power characteristic of the repeater transmission power level. In some examples, a wireless device may be configured to transmit at least one DL transmission, where the at least one DL transmission is associated with a first transmission power level including at least one first power characteristic. The first wireless device may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The first wireless device may be further configured to transmit a second indication of the at least one second power characteristic of the second transmission power level.

Particular aspects of the subject matter described in this disclosure can be implemented to realize one or more of the following potential advantages. In some examples, by considering the power levels of signaling at, and/or positioning of, a repeater when performing a positioning session, the described techniques can be used to more accurately determine positioning of wireless devices. That is, a network node and/or a network entity may be aware of the baseline (e.g., power characteristics of a repeater in the communications path, rather than the originating network node) from which the wireless device collects information for received DL signaling in view of the repeater, and more accurate positioning for the wireless device may be determined.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a power management component 198 ("component 198") that may be configured to receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The component 198 may also be configured to obtain an indication of the at least one repeater power characteristic of the repeater transmission power level. In certain aspects, the base station 102 may have a power management component 199 ("component 199") that may be configured to transmit at least one DL transmission, where the at least one DL transmission is associated with a first transmission power level including at least one first power characteristic. The component 199 may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The component 199 may be further configured to transmit a second indication of the at least one second power characteristic of the second transmission power level. In aspects, the component 199 may be configured to transmit, for a LMF, adjustment information, where the adjustment information includes at least one of a first range for a power level adjustment associated with the second transmission power level or a second range for a gain adjustment associated with the second transmission power level. In such aspects, the component 199 may be configured to receive, from the LMF, a request, where request indicates at least one of a first target value within the first range for the power level adjustment, a first relative adjustment value within the first range for the power level adjustment, a second target value within the second range for the gain adjustment, or a second relative adjustment value within the second range for the gain adjustment. In such aspects, the component 199 may be configured to transmit, for a network-controlled repeater (NCR), an indication of at least one of the first target value, the first relative adjustment value, the second target value, or the second relative adjustment value. In aspects, the component 199 may be configured to receive, from a LMF, a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB. In such aspects, the component 199 may be configured to transmit, for the NCR, an indication of at least one of the first target value, the first relative adjustment value, the second target value, or the second relative adjustment value. That is, aspects provide for repeater power management for positioning for positioning measurements that enable extensions of TRP information (e.g., SSB transmission power and PRS resource transmit power) and/or PRS configuration responses (e.g., PRS resource transmit power) to provide transmission power and gain characteristics of repeaters (e.g., NCRs) for network nodes and network entities to be utilized for positioning determinations of wireless devices in positioning sessions.

Figures 2A, 2B, 2C, 2D:
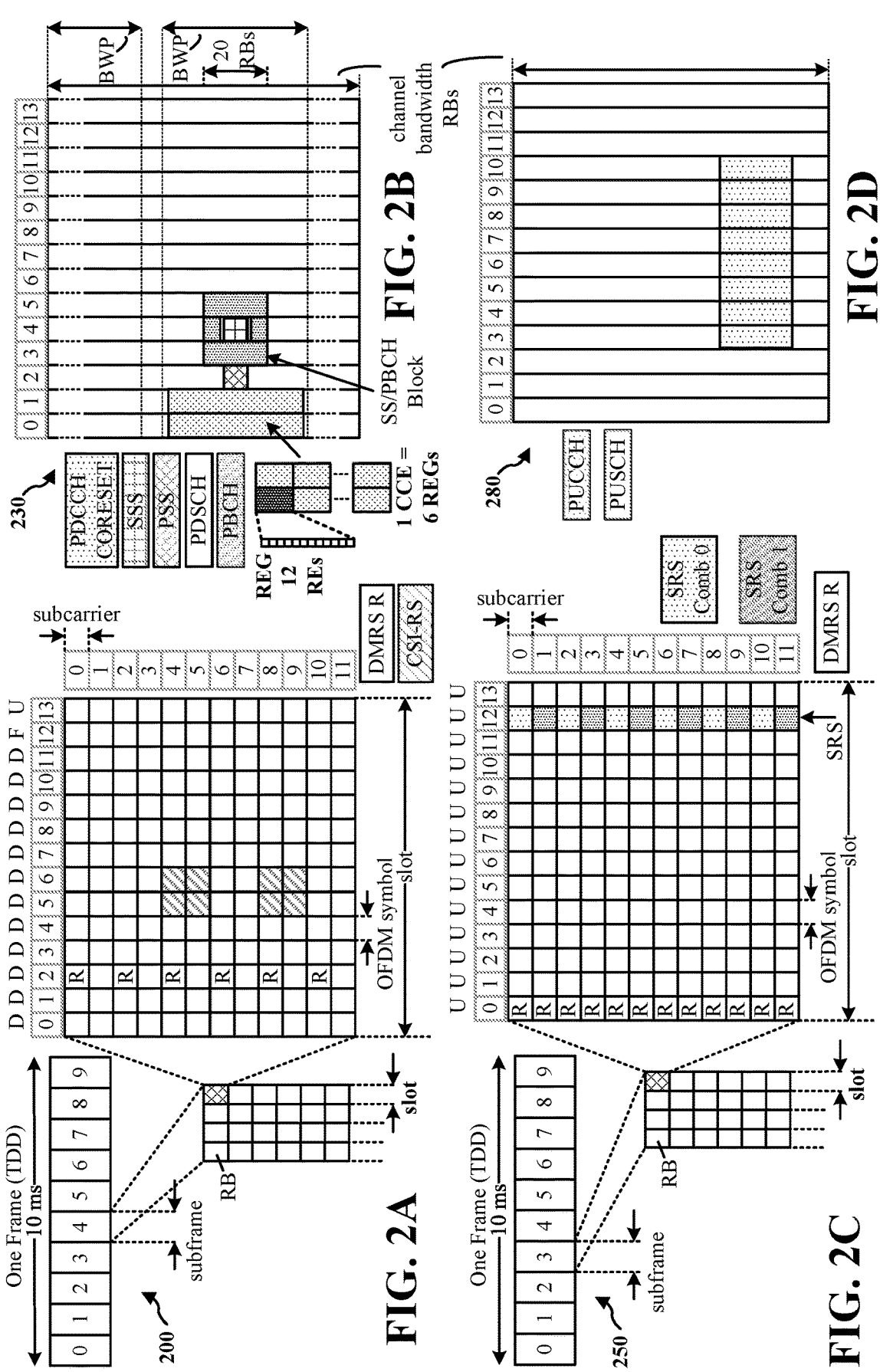
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS<br>$\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
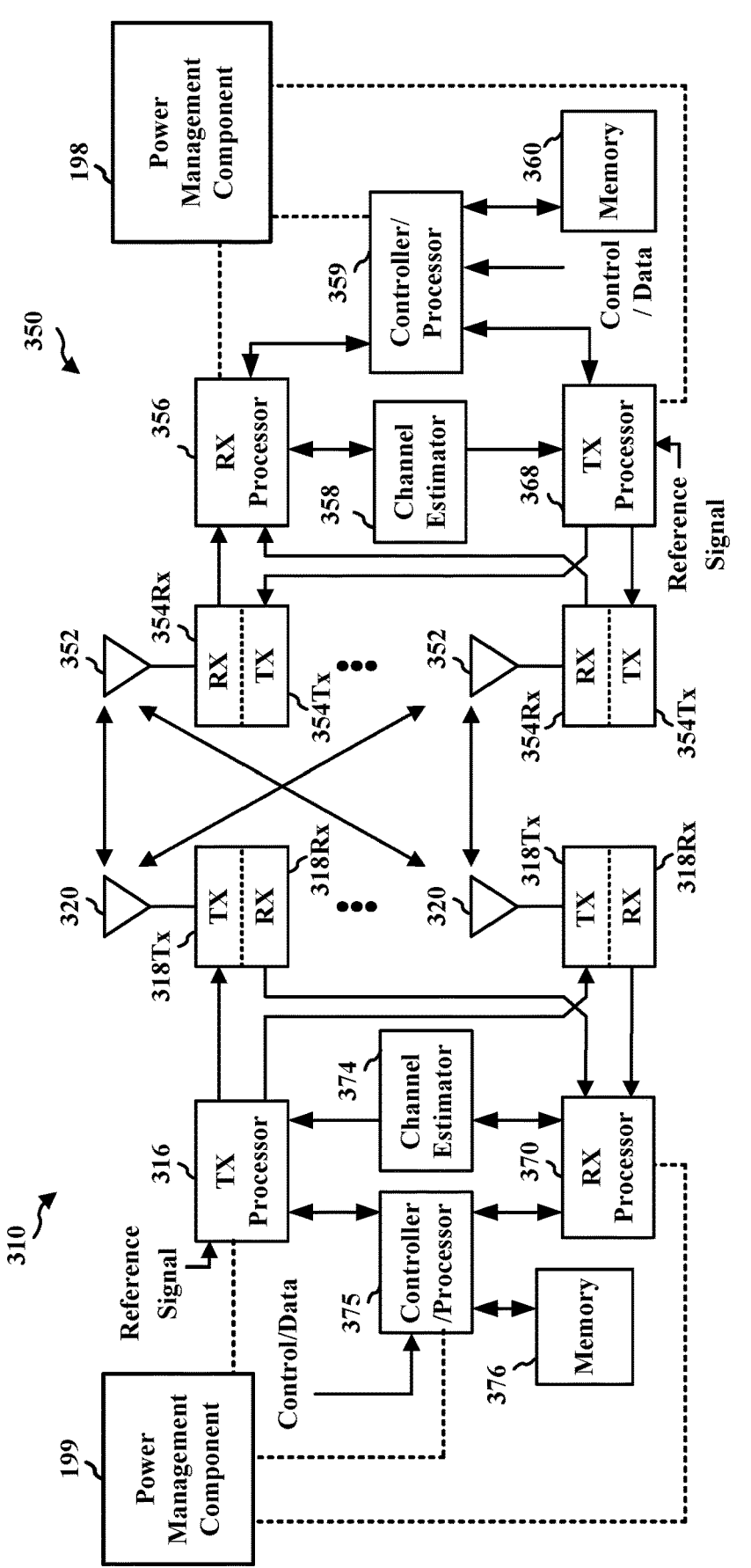
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Figure 4:
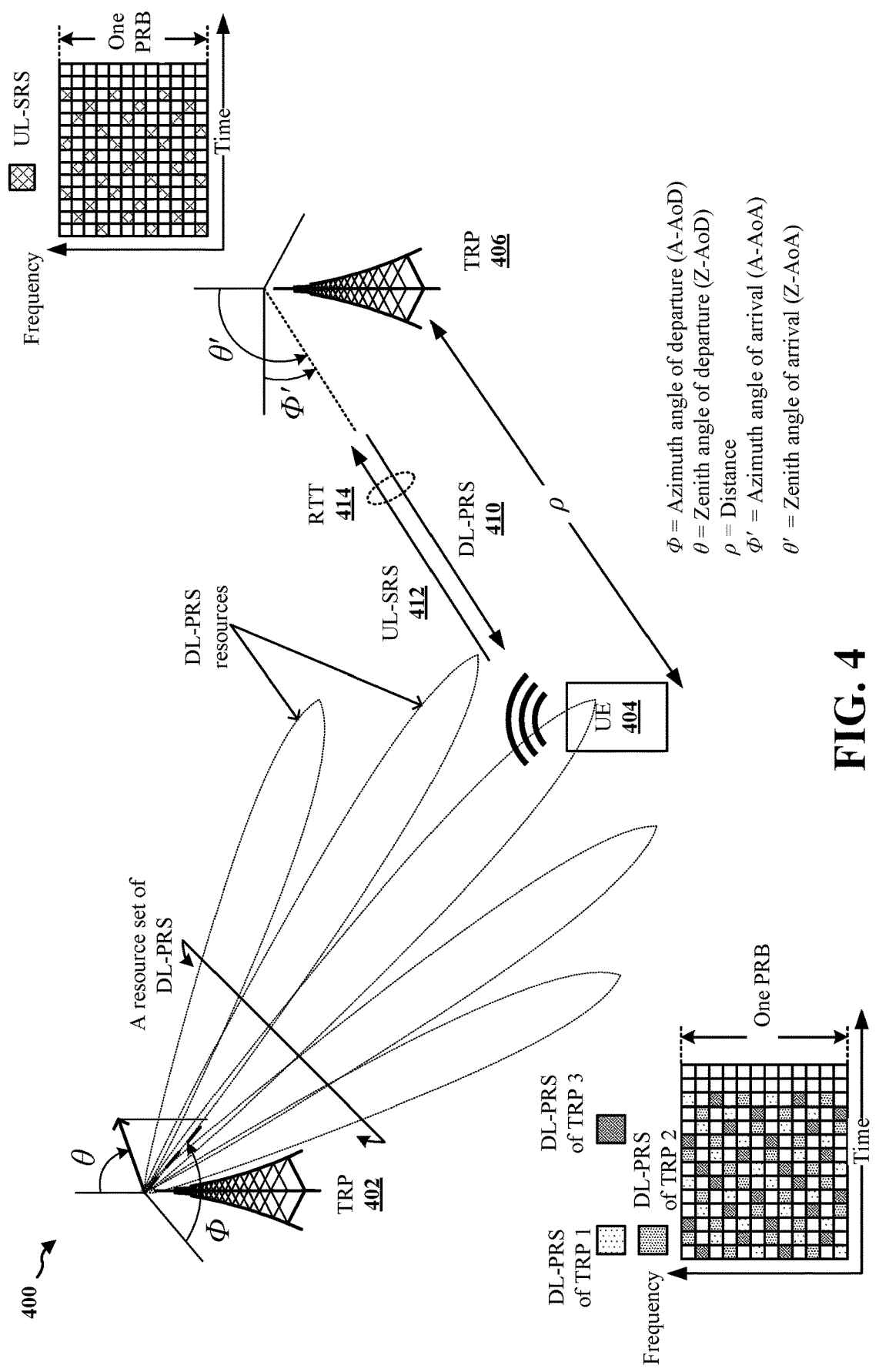
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

For purposes of the present disclosure, a positioning session may be referred to the transmitting, the receiving, and the measuring of reference signals for the purposes of determining a positioning result or state (e.g., a location, a heading, a velocity, etc.) of a target entity. A target entity may be any object (e.g., a person, a vehicle, wireless device such as a UE, etc.) for which a positioning session is performed, for example, to determine a location thereof, a velocity thereof, a heading thereof, etc.

Wireless communication networks and/or a wireless devices may utilize measurements associated with specific signaling to enable the determination of one or more angles of arrival, power levels of transmitted/received signals, etc., utilized for positioning operations. As one example, a network node, such as a base station, may provide DL signaling for a wireless device, such as a UE, which may respond with corresponding UL signaling that indicates the one or more angles of arrival, the power levels of transmitted/received signals, etc. Based on the received signaling, the network node, or a network entity, such as a LMF, may perform operations to determine positioning of the wireless device. However, scenarios may arise in which such signaling may not be adequate to determine an accurate positioning determination for the wireless device. For instance, a network node may communicate/exchange with a wireless device via a repeater. A repeater (e.g., a network-controlled repeater (NCR)) may be used to receive/forward positioning references for positioning of a wireless device. In some cases, such a repeater may forward DL/UL signaling between a network node and a wireless device (e.g., with no or minimal processing), and the network node is thus the logical source/destination of DL/UL signaling with respect to the wireless device. Yet, the positioning and transmission characteristics of the repeater should be considered as the repeater is the physical source/destination for positioning purposes, in such scenarios.

Aspects herein for repeater power management for positioning enable improved and more accurate positioning determinations for wireless devices. In some examples, a wireless device may be configured to receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The wireless device may also be configured to obtain an indication of the at least one repeater power characteristic of the repeater transmission power level. In some examples, a wireless device may be configured to transmit at least one DL transmission, where the at least one DL transmission is associated with a first transmission power level including at least one first power characteristic. The first wireless device may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The first wireless device may be further configured to transmit a second indication of the at least one second power characteristic of the second transmission power level.

Particular aspects of the subject matter described in this disclosure consider the power levels of signaling at, and/or positioning of, a repeater when performing a positioning session to more accurately determine positioning of wireless devices. That is, a network node and/or a network entity may be aware of the baseline (e.g., power characteristics of a repeater in the communications path, rather than the originating network node) from which the wireless device collects information for received DL signaling in view of the repeater, and more accurate positioning for the wireless device may be determined.

Figure 5:
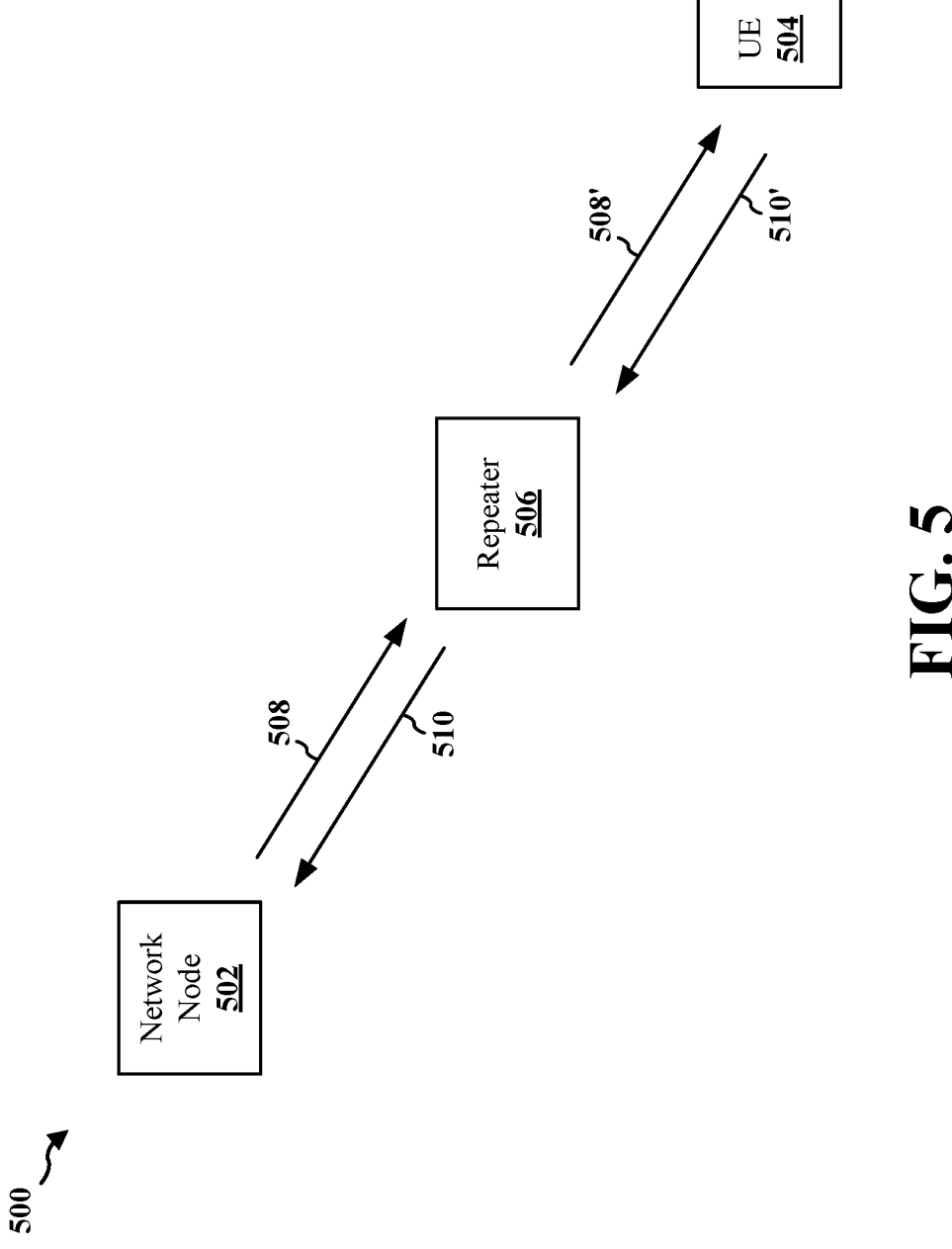
FIG. 5 is a diagram illustrating a repeater, in accordance with various aspects of the present disclosure.

For example, FIG. 5 is a diagram 500 illustrating a repeater 506 in various aspects. As shown in FIG. 5, the repeater 506 may receive DL signals 508 from a network node 502 and forward the DL signals (shown as signals 508') to a wireless device, e.g., a remote UE 504. Similarly, the repeater 506 may receive UL signals 510 from the remote UE 504 and forward the UL signals (shown as signals 510') to the network node 502. While the repeater 506 may forward the DL signal 508 and/or the UL signal 510 (e.g., with no or minimal processing), the network node 502 (e.g., a base station) may be the logical or originating source/destination of DL/UL signaling, respectively, the repeater 506 may be considered as the physical source/destination for positioning purposes.

For instance, the power levels of the DL signal 508' received at the remote UE 504 from the repeater 506 may differ from the DL signal 508 originally transmitted from the network node 502. As one example, power levels of a DL SSBs/PRS for the DL signal 508' received at the remote UE 504 may vary from the DL signal 508 originally transmitted from the network node 502 due to gain configurations/capabilities of the repeater 506, backhaul channel pathloss, etc. When the transmission power levels of a DL SSBs/PRS are exchanged between the wireless device and a network entity (e.g., a LMF) as part of TRP information and/or PRS configuration responses for positioning sessions, the network entity may be unaware of the effect the repeater 506 causes in the reception of the DL signal 508'. Aspects herein for repeater power management for positioning enable improved and more accurate positioning determinations for wireless devices. For instance, the transmission power characteristics for a DL reference signal (DL-RS), such as SSB, DL-PRS, etc., of a repeater such as the repeater 506 may be transmitted with power levels that are based on, and/or vary according to, the DL-RSRP of the repeater 506, the amplification gain of the repeater 506, etc. the DL-RSRP of the repeater 506 may change due to backhaul channel variations, beam changes, and/or the like, and the amplification gain of the repeater 506 may change to avoid self-oscillation, power amplifier saturation, and/or the like. Additionally, the repeater 506 may be configured to forward DL-RS signals with a constant output power, and in such cases, the gain may autonomously be changed by the repeater 506 to compensate for RSRP variations, while setting a maximum value that may be small enough to avoid self-oscillation or power amplifier saturation.

The network node 502 may be aware of, and/or set, the output transmission power of the repeater 506 and exchange associated information with a LMF via core network signaling. However, as the repeater 506 may be configured to forward signals with a constant gain, or as the gain setting of the repeater 506 may change dynamically/autonomously to avoid self-oscillation and/or power amplifier saturation, or in cases without power control for the repeater 506, the network node 502 may know a range of values (or maximum values) for transmission/output power levels but not actual values, amplification gain, or when amplification gain/transmission power level are changed dynamically by the repeater 506, the exact values configured at the repeater 506 may not be dynamically indicated to the LMF.

Figure 6:
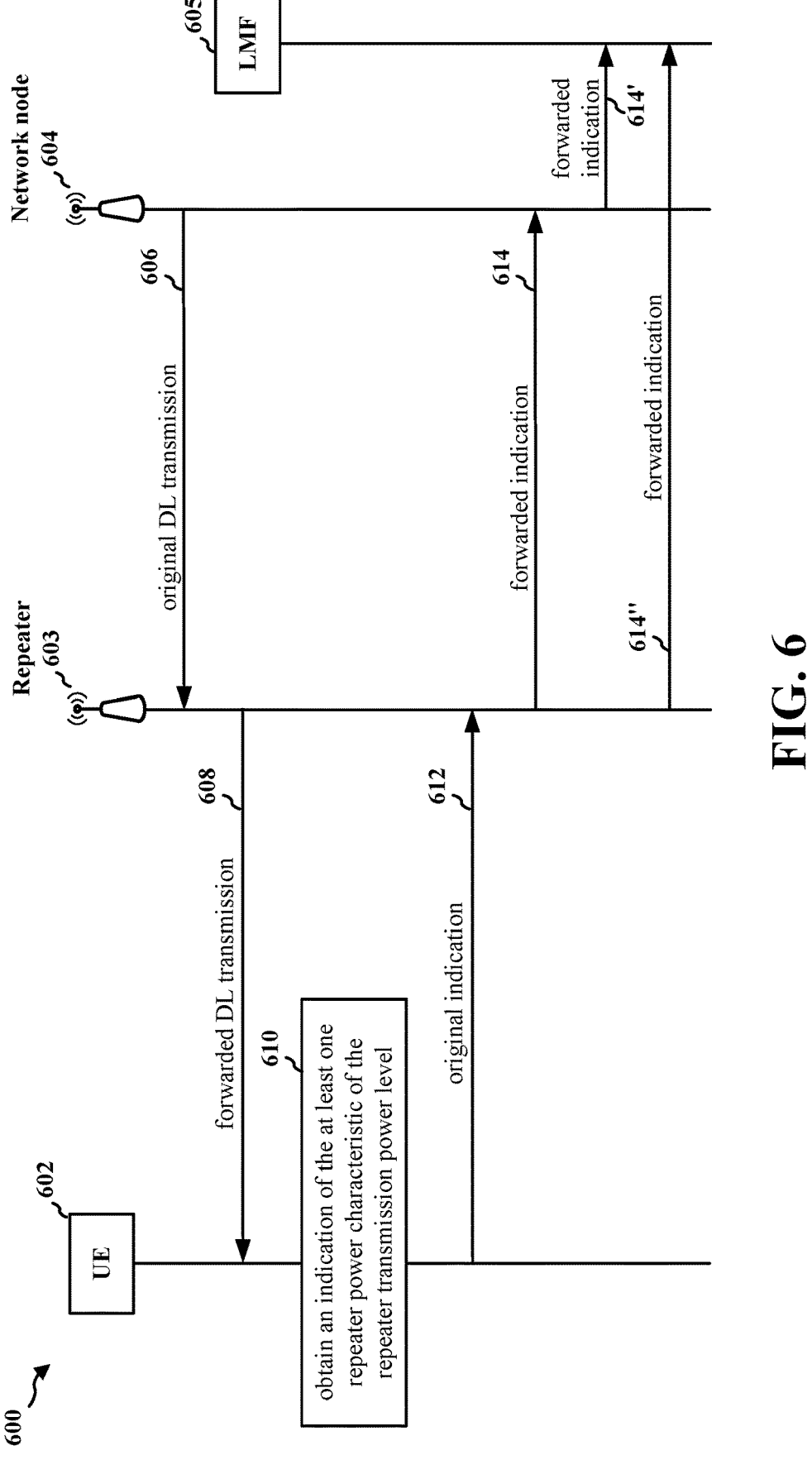
FIG. 6 is a call flow diagram for wireless communications, in accordance with various aspects of the present disclosure.

FIG. 6 is a call flow diagram 600 for wireless communications, in various aspects. Call flow diagram 600 illustrates repeater power management for positioning with a repeater (e.g., a repeater 603, such as a NCR) that may communicate with a wireless device (e.g., a UE 602, such as a remote UE, etc.), a network node (e.g., a network node 604, such as a base station, a gNB, or other type of base station or network node, etc.), and/or a LMF (e.g., a LMF 605), by way of example, as shown, in the performance of positioning operations/sessions. Aspects described for the network node 604 may be performed by the network node 604 in aggregated form and/or by one or more components of the network node 604 in disaggregated form. Additionally, or alternatively, the aspects may be performed by the UE 602 autonomously, in addition to, and/or in lieu of, operations of the network node 604. In aspects, the repeater 603 may include one or more of a NCR mobile termination unit (NCR-MT) or a NCR forwarding node (NCR-FW), each of which may perform described aspects together or separately.

In the illustrated aspect, the network node 604 may be configured to transmit/provide an original DL transmission 606 to the repeater 603. The original DL transmission 606 may be transmitted by the network node 604 at a first power level. The repeater 603 may be configured to receive the original DL transmission 606 at the first power level, and to transmit/provide a forwarded DL transmission 608 (which may be more than one transmission, in aspects) at a second transmission power level to the UE 602. As noted herein, the second transmission power level may be based on the power transmission level and/or the power amplifier characteristics of the repeater 603, e.g., amplifier gain capabilities/configurations, backhaul channel pathloss, and/or the like.

The UE 602 may be configured to receive at least one DL transmission at a reception power level. In aspects, a reception power level may be the power level of a signal when it is received at a receiver. For example, the UE 602 may be configured to receive the forwarded DL transmission 608 from the repeater 603. The forwarded DL transmission 608 may be associated with the initial transmission power level of the original DL transmission 606 provided by the network node 604, including at least one initial power characteristic that is different from at least one repeater power characteristic of the repeater 603 for a repeater transmission power level associated with the forwarded DL transmission 608. In aspects, the initial transmission power level and the repeater transmission power level may be associated with communication for a positioning session. In aspects, a transmission power level may be a power level of a signal as it is transmitted by a transmitter, and an initial transmission power level may be a power level of a signal as it is transmitted by a transmitter at its logical origination point of transmission (e.g., as described herein, an original DL signal transmission may be transmitted by a network node (at an initial transmission power level) and be forwarded as a forwarded DL signal transmission by a repeater (at a repeater transmission power level of the repeater) to a UE that receives the forwarded DL signal transmission (at a received/reception power level)). Likewise, an initial power characteristic of a signal may include characteristics/metrics associated with an initial transmission and/or its initial transmission power level when transmitted from the logical origination point of transmission, and a repeater power characteristic of a signal, e.g., a forwarded signal from a repeater, may include characteristics/metrics associated with an forwarded transmission and/or its transmission power level when forwarded from the a repeater.

The UE 602 may be configured to obtain an indication of the at least one repeater power characteristic of the repeater transmission power level. For example, the UE 602 may be configured to obtain (at 610) an indication 612 of a power characteristic(s) for the transmission power level of the repeater 603 associated with the forwarded DL transmission 608. The UE 602 may be configured to obtain (at 610) an indication 612 of a power characteristic(s) for the transmission power level of the repeater 603 associated with the forwarded DL transmission 608 via measurement thereof, from the network node 604, and/or from other operations/ sources, in various aspects.

In aspects, the indication 612 of the at least one repeater power characteristic of the repeater transmission power level for the repeater 603 may include a first power level for a SSB, a second power level for a PRS, and/or the like. In some aspects, the indication 612 of the at least one repeater power characteristic of the repeater transmission power level for the repeater 603 may indicate a range of transmission power of the repeater transmission power level for the repeater 603, a minimum range of transmission power of the repeater transmission power level for the repeater 603, a maximum range of transmission power of the repeater transmission power level for the repeater 603, a mean range of transmission power of the repeater transmission power level for the repeater 603, a percentile range of transmission power of the repeater transmission power level for the repeater 603, and/or the like. In some aspects, the indication 612 of the at least one repeater power characteristic of the repeater transmission power level for the repeater 603 may indicate a value of amplification gain for the repeater transmission power level of the repeater 603, a range of amplification gain for the repeater transmission power level of the repeater 603, a minimum range of amplification gain for the repeater transmission power level of the repeater 603, a maximum range of amplification gain for the repeater transmission power level of the repeater 603, a mean range of amplification gain for the repeater transmission power level of the repeater 603, a percentile range of amplification gain for the repeater transmission power level of the repeater 603, and/or the like. In some aspects, the indication 612 of the at least one repeater power characteristic of the repeater transmission power level for the repeater 603 may indicate a flag that indicates a constant power for the repeater transmission power level of the repeater 603, a constant gain for the repeater transmission power level of the repeater 603, and/or the like.

In aspects, the indication 612 of the at least one repeater power characteristic of the repeater transmission power level for the repeater 603 may indicate information for a DL-RSRP associated with the forwarded DL transmission 608. In such aspects, the information for the DL-RSRP may include a value of the DL-RSRP, a range of the DL-RSRP, a minimum value of the DL-RSRP, a maximum value of the DL-RSRP, a mean value of the DL-RSRP, a percentile value of the DL-RSRP, and/or the like. In such aspects, the information for the DL-RSRP may further include at least two instances of the information for the DL-RSRP that respectively correspond to at least two access directions associated with the DL-RSRP (e.g., for beams, other TRPs, etc.). In some aspects, the indication of the at least one repeater power characteristic of the repeater transmission power level for the repeater 603 may indicate a transmit power value, an amplification gain value, and/or the like, that corresponds to a DL beam(s) respectively associated with the forwarded DL transmission(s) 608. In some aspects, the indication of the at least one repeater power characteristic of the repeater transmission power level for the repeater 603 may indicate a constant output power for the forwarded DL transmission(s) 608.

The UE 602 may be configured to transmit/provide the indication 612, via an UL transmission, for the network node 604. In aspects, the indication 612 may be provided via the repeater 603 as an original indication from the UE 602. The repeater 603 may be configured to forward the indication 612 (the original indication from the UE 602) as a forwarded indication 614 for the network node 604. Accordingly, in some aspects, the network node 604 may be configured to obtain a first indication (e.g., the forwarded indication 614) of the second transmission power level of the at least one DL transmission (e.g., the forwarded DL transmission 608). In some aspects, the network node 604 may configure the repeater 603 for the first indication of the second transmission power level of the at least one DL transmission to obtain the first indication of the second transmission power level of the at least one DL transmission, as described in further detail below.

In some aspects, the network node 604 may be configured to provide/transmit the forwarded indication 614 to the LMF 605 as a forwarded indication 614'. In some aspects, the repeater 603 may be configured to provide/transmit the original indication 612 to the LMF 605 as a forwarded indication 614''.

Figure 7:
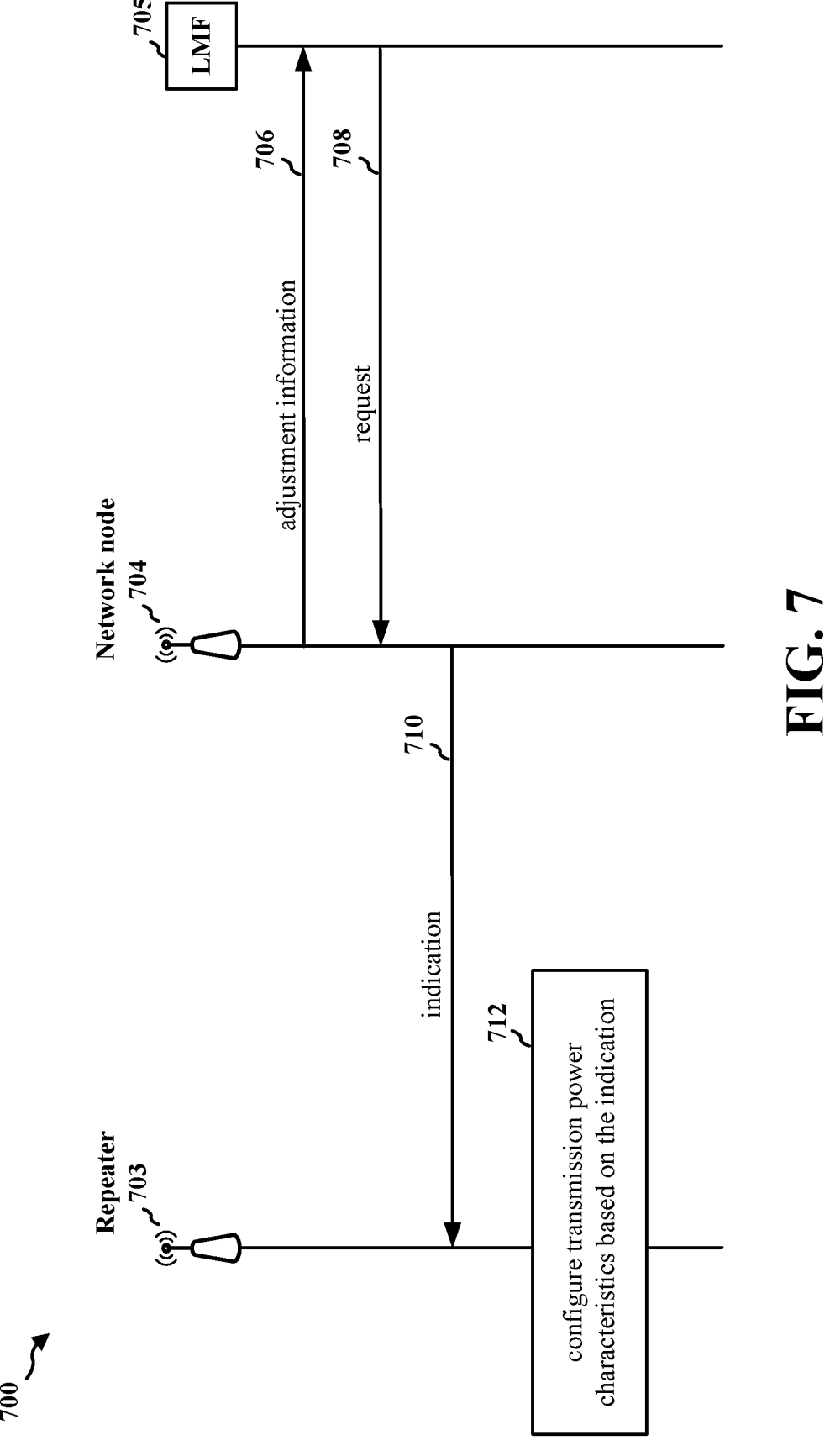
FIG. 7 is a call flow diagram for wireless communications, in accordance with various aspects of the present disclosure.

FIG. 7 is a call flow diagram 700 for wireless communications, in various aspects. Call flow diagram 700 illustrates repeater power management for positioning for positioning measurements utilizing a repeater (e.g., a repeater 703, such as a NCR) that may communicate with a network node (e.g., a network node 704, such as a base station, a gNB, or other type of base station or network node, etc.), and/or a LMF (e.g., a LMF 705), by way of example, as shown, in the performance of positioning operations/sessions. Call flow diagram 700 may be a further aspect of call flow diagram 600 shown in FIG. 6. Aspects described for the network node 704 may be performed by the network node 704 in aggregated form and/or by one or more components of the network node 704 in disaggregated form. In aspects, the repeater 703 may include one or more of a NCR mobile termination unit (NCR-MT) or a NCR forwarding node (NCR-FW), each of which may perform described aspects together or separately.

In the illustrated aspect, the network node 704 may be configured to transmit, for a LMF (e.g., the LMF 705), adjustment information 706. In aspects, the adjustment information 706 may include a first range for a power level adjustment associated with the second transmission power level, a second range for a gain adjustment associated with the second transmission power level, and/or the like. In some aspects, the adjustment information may include transmission-reception power information.

The network node 704 may be configured to receive, from the LMF 705, a request 708. In aspects, the request 708 may indicate a first target value within the first range for the power level adjustment, a first relative adjustment value within the first range for the power level adjustment, a second target value within the second range for the gain adjustment, a second relative adjustment value within the second range for the gain adjustment, and/or the like. In some aspects, the request 708 may include a PRS configuration request with DL PRS transmission characteristics.

The network node 704 may be configured to transmit, for the repeater 703, an indication 710 of the first target value, the first relative adjustment value, the second target value, the second relative adjustment value, and/or the like. In aspects, the repeater 703 may have one or more transmission power characteristics configured (at 712) based on the indication 710 from the network node 704. The repeater 703 may thus be configured to forward DL transmissions from the network node 704 as described herein for a UE (e.g., as in call flow diagram 600 of FIG. 6).

Figure 8:
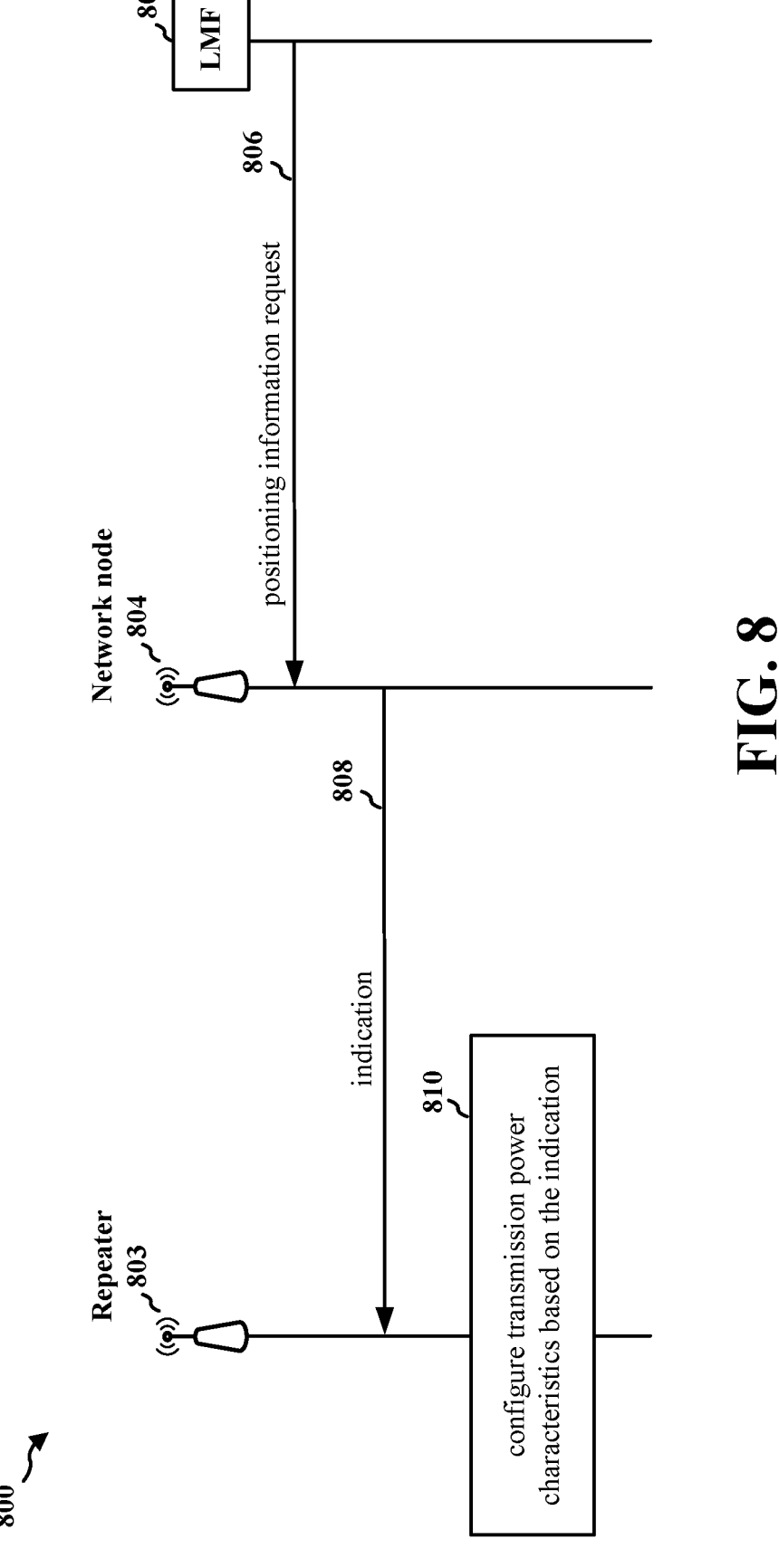
FIG. 8 is a call flow diagram for wireless communications, in accordance with various aspects of the present disclosure.

FIG. 8 is a call flow diagram 800 for wireless communications, in various aspects. Call flow diagram 800 illustrates repeater power management for positioning for positioning measurements utilizing a repeater (e.g., a repeater 803, such as a NCR) that may communicate with a network node (e.g., a network node 804, such as a base station, a gNB, or other type of base station or network node, etc.), and/or a LMF (e.g., a LMF 805), by way of example, as shown, in the performance of positioning operations/sessions. Flow diagram 800 may be a further aspect of call flow diagram 600 shown in FIG. 6 and/or of call flow diagram 700 shown in FIG. 7. Aspects described for the network node 804 may be performed by the network node 804 in aggregated form and/or by one or more components of the network node 804 in disaggregated form. In aspects, the repeater 803 may include one or more of a NCR mobile termination unit (NCR-MT) or a NCR forwarding node (NCR-FW), each of which may perform described aspects together or separately.

In the illustrated aspect, the network node 804 may be configured to receive, from a LMF (e.g., the LMF 805), a positioning information request 806. In aspects, the positioning information request 806 may indicate requested transmission characteristics associated with at least one SSB. For example, the indicated requested transmission characteristics may include a first target value of a power level adjustment for the at least one SSB, a first relative adjustment value of the power level adjustment for the at least one SSB, a second target value of a gain adjustment for the at least one SSB, a second relative adjustment value of the gain adjustment for the at least one SSB, and/or the like.

The network node 804 may be configured to transmit, for the repeater 803, an indication 808 of the first target value, the first relative adjustment value, the second target value, the second relative adjustment value, and/or the like. In aspects, the repeater 803 may have one or more transmission power characteristics configured (at 810) based on the indication 808 from the network node 804. The repeater 803 may thus be configured to forward DL transmissions from the network node 804 as described herein for a UE (e.g., as in call flow diagram 600 of FIG. 6).

With reference now to FIGS. 6, 7, 8, and the repeater 603, the repeater 703, the repeater 803, as respectively described, a repeater may be configured to perform aspects herein for repeater power management for positioning for positioning measurements. For instance, a repeater herein may be configured to receive at least one transmission, where the at least one transmission is associated with a first transmission power level. The repeater may also be configured to transmit the at least one transmission at a second transmission power level, where the second transmission power level has at least one power characteristic that is different from the first transmission power level. The repeater may be further configured to obtain an indication of the at least one power characteristic of the second transmission power level. The repeater, to transmit the at least one transmission at the second transmission power level, may be configured to forward the at least one transmission at the second transmission power level. The repeater, to forward the at least one transmission at the second transmission power level, may be configured to forward, from a second wireless device to a third wireless device, the at least one transmission at the second transmission power level. In aspects for the repeaters described herein, the first wireless device may be a repeater or a repeating device, the second wireless device may be a second UE, a second network node, a second network entity, and/or the like, and the third wireless device may be a third UE, a third network node, a third network entity, and/or the like. In aspects for the repeaters described herein, the indication of the at least one power characteristic of the second transmission power level may include a transmission power for a SSB, a transmission power for a PRS, a transmission power for a SRS, and/or the like. The repeater, to receive the at least one transmission, may be configured to receive at least one DL transmission from a network node. The repeater, to transmit the at least one transmission, may be configured to transmit the at least one DL transmission for a UE. The repeater may be configured to transmit the indication to at least one of the network node or a LMF node. The repeater, to receive the at least one transmission, may be configured to receive at least one sidelink (SL) transmission and/or to receive at least one UL transmission.

FIG. 9 is a flowchart 900 of a method of wireless communication, in various aspects. The method may be performed by a wireless device (e.g., the UE 104, 404, 504, 602; the TRP 402, 406; the apparatus 1104). In some aspects, the method may include aspects described in connection with the communication flow in FIG. 6 and/or aspects described in FIGS. 7, 8. The method provides for repeater power management for positioning for positioning measurements that enable extensions of TRP information (e.g., SSB transmission power and PRS resource transmit power) and/or PRS configuration responses (e.g., PRS resource transmit power) to provide transmission power and gain characteristics of repeaters (e.g., NCRs) for network nodes and network entities to be utilized for positioning determinations of wireless devices in positioning sessions.

At 902, a wireless device receives at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. As an example, the reception may be performed, at least in part, by the component 198. FIG. 6 may illustrate an example of a wireless device (e.g., the UE 602) receiving such DL transmissions from a repeater (e.g., the repeater 603).

For example, the network node 604 may be configured to transmit/provide an original DL transmission 606 to the repeater 603. The original DL transmission 606 may be transmitted by the network node 604 at a first power level. The repeater 603 may be configured to receive the original DL transmission 606 at the first power level, and to transmit/provide a forwarded DL transmission 608 (which may be more than one transmission, in aspects) at a second transmission power level to the UE 602. As noted herein, the second transmission power level may be based on the power transmission level and/or the power amplifier characteristics of the repeater 603, e.g., amplifier gain capabilities/configurations, backhaul channel pathloss, and/or the like.

The UE 602 may be configured to receive at least one DL transmission at a reception power level. For example, the UE 602 may be configured to receive the forwarded DL transmission 608 from the repeater 603. The forwarded DL transmission 608 may be associated with the initial transmission power level of the original DL transmission 606 provided by the network node 604, including at least one initial power characteristic that is different from at least one repeater power characteristic of the repeater 603 for a repeater transmission power level associated with the forwarded DL transmission 608. In aspects, the initial transmission power level and the repeater transmission power level may be associated with communication for a positioning session.

At 904, the wireless device obtains an indication of the at least one repeater power characteristic of the repeater transmission power level. As an example, the obtaining may be performed, at least in part, by the component 198. FIG. 6 may illustrate an example of a wireless device (e.g., the UE 602) obtaining such an indication.

For example, the UE 602 may be configured to obtain an indication of the at least one repeater power characteristic of the repeater transmission power level. For example, the UE 602 may be configured to obtain (at 610) an indication 612 of a power characteristic(s) for the transmission power level of the repeater 603 associated with the forwarded DL transmission 608. The UE 602 may be configured to obtain (at 610) an indication 612 of a power characteristic(s) for the transmission power level of the repeater 603 associated with the forwarded DL transmission 608 via measurement thereof, from the network node 604, and/or from other operations/sources, in various aspects.

In aspects, the indication 612 of the at least one repeater power characteristic of the repeater transmission power level for the repeater 603 may include a first power level for a SSB, a second power level for a PRS, and/or the like. In some aspects, the indication 612 of the at least one repeater power characteristic of the repeater transmission power level for the repeater 603 may indicate a range of transmission power of the repeater transmission power level for the repeater 603, a minimum range of transmission power of the repeater transmission power level for the repeater 603, a maximum range of transmission power of the repeater transmission power level for the repeater 603, a mean range of transmission power of the repeater transmission power level for the repeater 603, a percentile range of transmission power of the repeater transmission power level for the repeater 603, and/or the like. In some aspects, the indication 612 of the at least one repeater power characteristic of the repeater transmission power level for the repeater 603 may indicate a value of amplification gain for the repeater transmission power level of the repeater 603, a range of amplification gain for the repeater transmission power level of the repeater 603, a minimum range of amplification gain for the repeater transmission power level of the repeater 603, a maximum range of amplification gain for the repeater transmission power level of the repeater 603, a mean range of amplification gain for the repeater transmission power level of the repeater 603, a percentile range of amplification gain for the repeater transmission power level of the repeater 603, and/or the like. In some aspects, the indication 612 of the at least one repeater power characteristic of the repeater transmission power level for the repeater 603 may indicate a flag that indicates a constant power for the repeater transmission power level of the repeater 603, a constant gain for the repeater transmission power level of the repeater 603, and/or the like.

In aspects, the indication 612 of the at least one repeater power characteristic of the repeater transmission power level for the repeater 603 may indicate information for a DLRSRP associated with the forwarded DL transmission 608. In such aspects, the information for the DL-RSRP may include a value of the DL-RSRP, a range of the DL-RSRP, a minimum value of the DL-RSRP, a maximum value of the DL-RSRP, a mean value of the DL-RSRP, a percentile value of the DL-RSRP, and/or the like. In such aspects, the information for the DL-RSRP may further include at least two instances of the information for the DL-RSRP that respectively correspond to at least two access directions associated with the DL-RSRP (e.g., for beams, other TRPs, etc.). In some aspects, the indication of the at least one repeater power characteristic of the repeater transmission power level for the repeater 603 may indicate a transmit power value, an amplification gain value, and/or the like, that corresponds to a DL beam(s) respectively associated with the forwarded DL transmission(s) 608. In some aspects, the indication of the at least one repeater power characteristic of the repeater transmission power level for the repeater 603 may indicate a constant output power for the forwarded DL transmission(s) 608.

The UE 602 may be configured to transmit/provide the indication 612, via an UL transmission, for the network node 604. In aspects, the indication 612 may be provided via the repeater 603 as an original indication from the UE 602. The repeater 603 may be configured to forward the indication 612 (the original indication from the UE 602) as a forwarded indication 614 for the network node 604. Accordingly, in some aspects, the network node 604 may be configured to obtain a first indication (e.g., the forwarded indication 614) of the second transmission power level of the at least one DL transmission (e.g., the forwarded DL transmission 608). In some aspects, the network node 604 may configure the repeater 603 for the first indication of the second transmission power level of the at least one DL transmission to obtain the first indication of the second transmission power level of the at least one DL transmission, as described in further detail below.

In some aspects, the network node 604 may be configured to provide/transmit the forwarded indication 614 to the LMF 605 as a forwarded indication 614'. In some aspects, the repeater 603 may be configured to provide/transmit the original indication 612 to the LMF 605 as a forwarded indication 614".

FIG. 10 is a flowchart 1000 of a method of wireless communication, in various aspects. The method may be performed by wireless device (e.g., a base station such as the base station 102; the network node 604, 704, 804; the network entity 1102, 1202, 1360). In some aspects, the method may include aspects described in connection with the communication flow in FIG. 6 and/or aspects described in FIGS. 7, 8. The method provides for repeater power management for positioning for positioning measurements that enable extensions of TRP information (e.g., SSB transmission power and PRS resource transmit power) and/or PRS configuration responses (e.g., PRS resource transmit power) to provide transmission power and gain characteristics of repeaters (e.g., NCRs) for network nodes and network entities to be utilized for positioning determinations of wireless devices in positioning sessions.

At 1002, a network node transmits at least one DL transmission, where the at least one DL transmission is associated with a first transmission power level including at least one first power characteristic. As an example, the transmission may be performed, at least in part, by the component 199. FIG. 6 may illustrate an example of a wireless device (e.g., the network node 604) transmitting such a DL transmission(s) for another wireless device (e.g., a UE such as the UE 602) via a repeater (e.g., a NCR such as the repeater 603).

For example, the network node 604 may be configured to transmit/provide an original DL transmission 606 to the repeater 603. The original DL transmission 606 may be transmitted by the network node 604 at a first power level. The repeater 603 may be configured to receive the original DL transmission 606 at the first power level, and to transmit/provide a forwarded DL transmission 608 (which may be more than one transmission, in aspects) at a second transmission power level to the UE 602. As noted herein, the second transmission power level may be based on the power transmission level and/or the power amplifier characteristics of the repeater 603, e.g., amplifier gain capabilities/configurations, backhaul channel pathloss, and/or the like.

The UE 602 may be configured to receive at least one DL transmission at a reception power level. For example, the UE 602 may be configured to receive the forwarded DL transmission 608 from the repeater 603. The forwarded DL transmission 608 may be associated with the initial transmission power level of the original DL transmission 606 provided by the network node 604, including at least one initial power characteristic that is different from at least one repeater power characteristic of the repeater 603 for a repeater transmission power level associated with the forwarded DL transmission 608. In aspects, the initial transmission power level and the repeater transmission power level may be associated with communication for a positioning session.

At 1004, the wireless device obtains a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. As an example, the transmission may be performed, at least in part, by the component 199. FIGS. 6, 7 may illustrate an example of a wireless device (e.g., the network node 604) obtaining such an indication.

For example, the UE 602 may be configured to obtain an indication of the at least one repeater power characteristic of the repeater transmission power level. For example, the UE 602 may be configured to obtain (at 610) an indication 612 of a power characteristic(s) for the transmission power level of the repeater 603 associated with the forwarded DL transmission 608. The UE 602 may be configured to obtain (at 610) an indication 612 of a power characteristic(s) for the transmission power level of the repeater 603 associated with the forwarded DL transmission 608 via measurement thereof, from the network node 604, and/or from other operations/sources, in various aspects. In aspects, the indication 612 of the at least one repeater power characteristic of the repeater transmission power level for the repeater 603 may include a first power level for a SSB, a second power level for a PRS, and/or the like. In some aspects, the indication 612 of the at least one repeater power characteristic of the repeater transmission power level for the repeater 603 may indicate a range of transmission power of the repeater transmission power level for the repeater 603, a minimum range of transmission power of the repeater transmission power level for the repeater 603, a maximum range of transmission power of the repeater transmission power level for the repeater 603, a mean range of transmission power of the repeater transmission power level for the repeater 603, a percentile range of transmission power of the repeater transmission power level for the repeater 603, and/or the like. In some aspects, the indication 612 of the at least one repeater power characteristic of the repeater transmission power level for the repeater 603 may indicate a value of amplification gain for the repeater transmission power level of the repeater 603, a range of amplification gain for the repeater transmission power level of the repeater 603, a minimum range of amplification gain for the repeater transmission power level of the repeater 603, a maximum range of amplification gain for the repeater transmission power level of the repeater 603, a mean range of amplification gain for the repeater transmission power level of the repeater 603, a percentile range of amplification gain for the repeater transmission power level of the repeater 603, and/or the like. In some aspects, the indication 612 of the at least one repeater power characteristic of the repeater transmission power level for the repeater 603 may indicate a flag that indicates a constant power for the repeater transmission power level of the repeater 603, a constant gain for the repeater transmission power level of the repeater 603, and/or the like. In aspects, the indication 612 of the at least one repeater power characteristic of the repeater transmission power level for the repeater 603 may indicate information for a DL-RSRP associated with the forwarded DL transmission 608. In such aspects, the information for the DL-RSRP may include a value of the DL-RSRP, a range of the DL-RSRP, a minimum value of the DL-RSRP, a maximum value of the DL-RSRP, a mean value of the DL-RSRP, a percentile value of the DL-RSRP, and/or the like. In such aspects, the information for the DL-RSRP may further include at least two instances of the information for the DL-RSRP that respectively correspond to at least two access directions associated with the DL-RSRP (e.g., for beams, other TRPs, etc.). In some aspects, the indication of the at least one repeater power characteristic of the repeater transmission power level for the repeater 603 may indicate a transmit power value, an amplification gain value, and/or the like, that corresponds to a DL beam(s) respectively associated with the forwarded DL transmission(s) 608. In some aspects, the indication of the at least one repeater power characteristic of the repeater transmission power level for the repeater 603 may indicate a constant output power for the forwarded DL transmission(s) 608.

The UE 602 may be configured to transmit/provide the indication 612, via an UL transmission, for the network node 604. In aspects, the indication 612 may be provided via the repeater 603 as an original indication from the UE 602. The repeater 603 may be configured to forward the indication 612 (the original indication from the UE 602) as a forwarded indication 614 for the network node 604. Accordingly, in some aspects, the network node 604 may be configured to obtain a first indication (e.g., the forwarded indication 614) of the second transmission power level of the at least one DL transmission (e.g., the forwarded DL transmission 608).

In some aspects, the network node 604 may configure the repeater 603 for the first indication (e.g., equivalent to, or the same as, the forwarded indication 614) of the second transmission power level of the at least one DL transmission to obtain the first indication of the second transmission power level of the at least one DL transmission.

As one example, and with reference to FIG. 7, the network node 704 may be configured to transmit, for a LMF (e.g., the LMF 705), adjustment information 706. In aspects, the adjustment information 706 may include a first range for a power level adjustment associated with the second transmission power level, a second range for a gain adjustment associated with the second transmission power level, and/or the like. In some aspects, the adjustment information may include transmission-reception power information. The network node 704 may be configured to receive, from the LMF 705, a request 708. In aspects, the request 708 may indicate a first target value within the first range for the power level adjustment, a first relative adjustment value within the first range for the power level adjustment, a second target value within the second range for the gain adjustment, a second relative adjustment value within the second range for the gain adjustment, and/or the like. In some aspects, the request 708 may include a PRS configuration request with DL PRS transmission characteristics. The network node 704 may be configured to transmit, for the repeater 703, an indication 710 of the first target value, the first relative adjustment value, the second target value, the second relative adjustment value, and/or the like. In aspects, the repeater 703 may have one or more transmission power characteristics configured (at 712) based on the indication 710 from the network node 704. The repeater 703 may thus be configured to forward DL transmissions from the network node 704 as described herein for a UE (e.g., as in call flow diagram 600 of FIG. 6).

As another example, and with reference to FIG. 8, the network node 804 may be configured to receive, from a LMF (e.g., the LMF 805), a positioning information request 806. In aspects, the positioning information request 806 may indicate requested transmission characteristics associated with at least one SSB. For example, the indicated requested transmission characteristics may include a first target value of a power level adjustment for the at least one SSB, a first relative adjustment value of the power level adjustment for the at least one SSB, a second target value of a gain adjustment for the at least one SSB, a second relative adjustment value of the gain adjustment for the at least one SSB, and/or the like. The network node 804 may be configured to transmit, for the repeater 803, an indication 808 of the first target value, the first relative adjustment value, the second target value, the second relative adjustment value, and/or the like. In aspects, the repeater 803 may have one or more transmission power characteristics configured (at 810) based on the indication 808 from the network node 804. The repeater 803 may thus be configured to forward DL transmissions from the network node 804 as described herein for a UE (e.g., as in call flow diagram 600 of FIG. 6).

At 1006, the wireless device transmits a second indication of the at least one second power characteristic of the second transmission power level. As an example, the transmission may be performed, at least in part, by the component 199. FIG. 6 may illustrate an example of a wireless device (e.g., the network node 604) transmitting such a DL transmission(s) for another wireless device (e.g., a UE such as the UE 602) via a repeater (e.g., a NCR such as the repeater 603).

In some aspects, the network node 604 may be configured to provide/transmit the forwarded indication 614 to the LMF 605 as a forwarded indication 614'. In some aspects, the repeater 603 may be configured to provide/transmit the original indication 612 to the LMF 605 as a forwarded indication 614".

Figure 11:
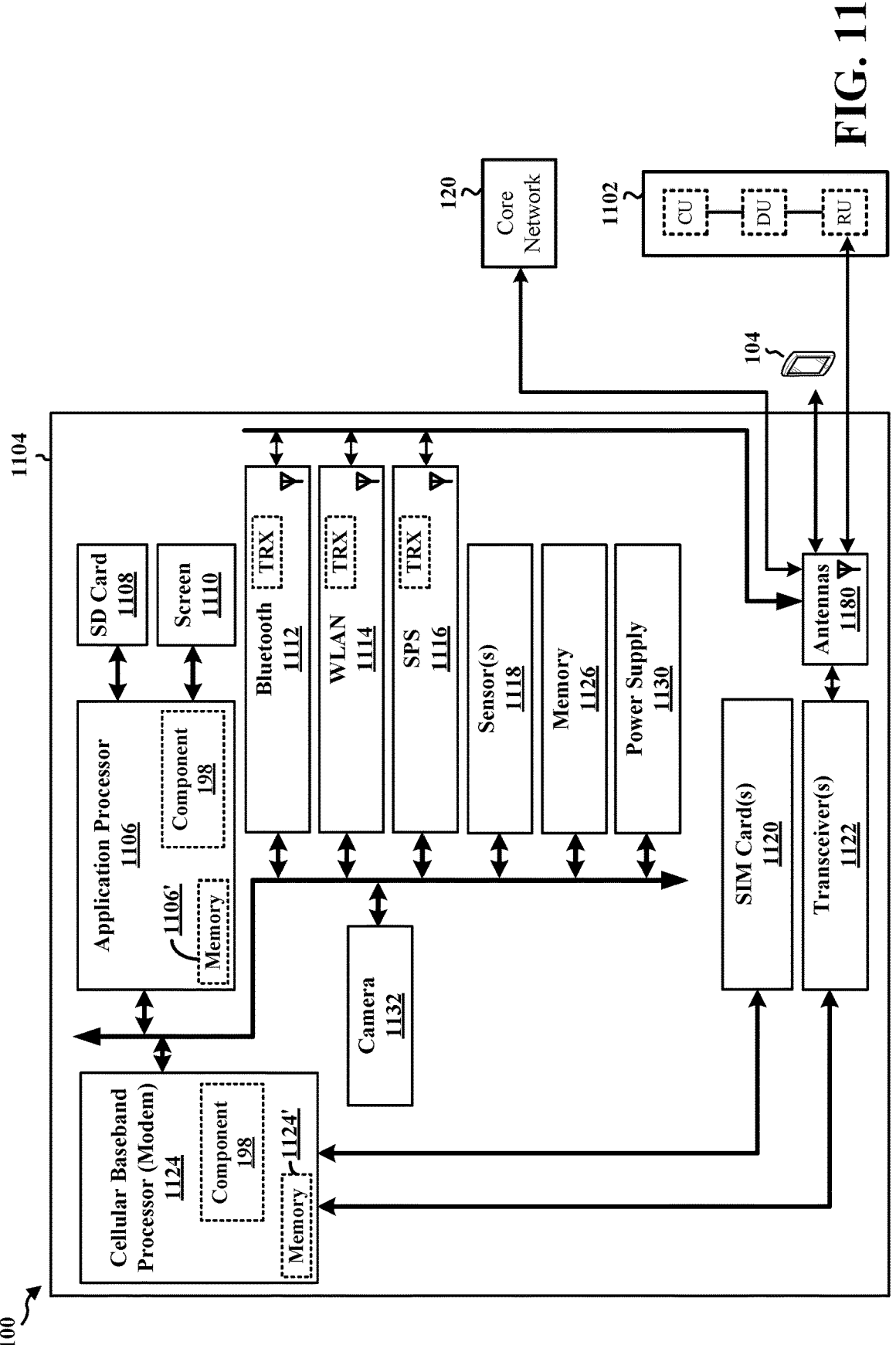
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104, with the core network 120, and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/ application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The component 198 may also be configured to obtain an indication of the at least one repeater power characteristic of the repeater transmission power level. The component 198 may be further configured to perform any of the aspects described in connection with the flowcharts in any of FIGS. 9, 10, and/or any of the aspects performed by a wireless device for any of FIGS. 5-8. The component 198 may also configured to obtain an indication of the at least one repeater power characteristic of the repeater transmission power level. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for receiving at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. In one configuration, the apparatus 1104, and in particular the cellular baseband processor 1124 and/or the application processor 1106, may include means for obtaining an indication of the at least one repeater power characteristic of the repeater transmission power level. The means may be the component 198 of the apparatus 1104 configured to perform the functions recited by the means. As described supra, the apparatus 1104 may include the TX processor 368, the RX processor 356, and the controller/ processor 359. As such, in one configuration, the means may be the TX processor 368, the RX processor 356, and/or the controller/processor 359 configured to perform the functions recited by the means.

Figure 12:
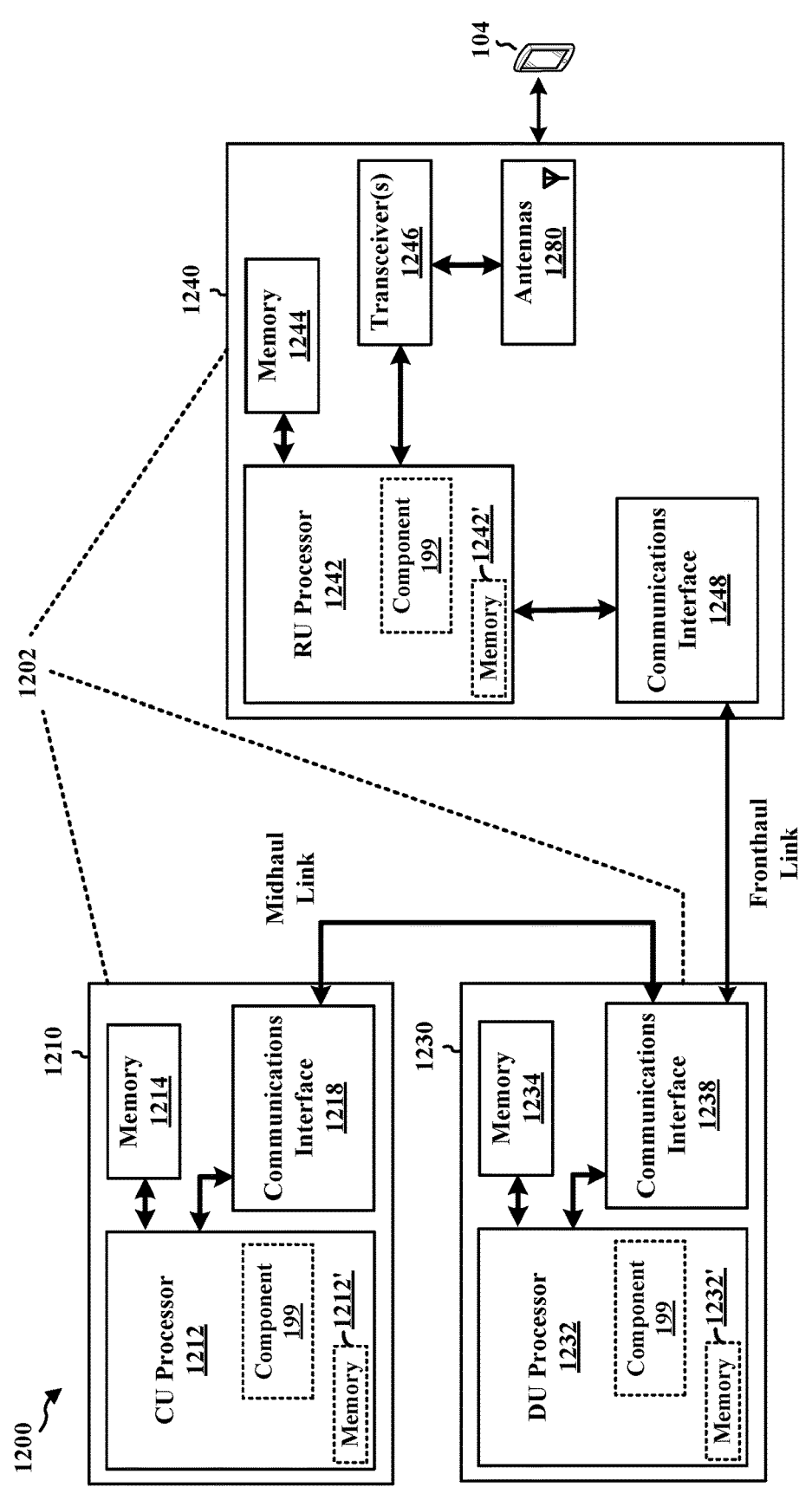
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit at least one DL transmission, where the at least one DL transmission is associated with a first transmission power level including at least one first power characteristic. The component 199 may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The component 199 may be further configured to transmit a second indication of the at least one second power characteristic of the second transmission power level. In aspects, the component 199 may be configured to transmit, for a LMF, adjustment information, where the adjustment information includes at least one of a first range for a power level adjustment associated with the second transmission power level or a second range for a gain adjustment associated with the second transmission power level. In such aspects, the component 199 may be configured to receive, from the LMF, a request, where request indicates at least one of a first target value within the first range for the power level adjustment, a first relative adjustment value within the first range for the power level adjustment, a second target value within the second range for the gain adjustment, or a second relative adjustment value within the second range for the gain adjustment. In such aspects, the component 199 may be configured to transmit, for a network-controlled repeater (NCR), an indication of at least one of the first target value, the first relative adjustment value, the second target value, or the second relative adjustment value. In aspects, the component 199 may be configured to receive, from a LMF, a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB. In such aspects, the component 199 may be configured to transmit, for the NCR, an indication of at least one of the first target value, the first relative adjustment value, the second target value, or the second relative adjustment value. The component 199 may be further configured to perform any of the aspects described in connection with the flowcharts in any of FIGS. 9, 10, and/or any of the aspects performed by a wireless device for any of FIGS. 5-8. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for transmitting at least one DL transmission, where the at least one DL transmission is associated with a first transmission power level including at least one first power characteristic. In the configuration, the network entity 1202 may include means for obtaining a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. In the configuration, the network entity 1202 may include means for transmitting a second indication of the at least one second power characteristic of the second transmission power level. In one configuration, the network entity 1202 may include means for transmitting, for a LMF, adjustment information, where the adjustment information includes at least one of a first range for a power level adjustment associated with the second transmission power level or a second range for a gain adjustment associated with the second transmission power level. In one configuration, the network entity 1202 may include means for receiving, from the LMF, a request, where request indicates at least one of a first target value within the first range for the power level adjustment, a first relative adjustment value within the first range for the power level adjustment, a second target value within the second range for the gain adjustment, or a second relative adjustment value within the second range for the gain adjustment. In the configuration, the network entity 1202 may include means for transmitting, for a network-controlled repeater (NCR), an indication of at least one of the first target value, the first relative adjustment value, the second target value, or the second relative adjustment value. In one configuration, the network entity 1202 may include means for receiving, from a LMF, a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB. In the configuration, the network entity 1202 may include means for transmitting, for the NCR, an indication of at least one of the first target value, the first relative adjustment value, the second target value, or the second relative adjustment value. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
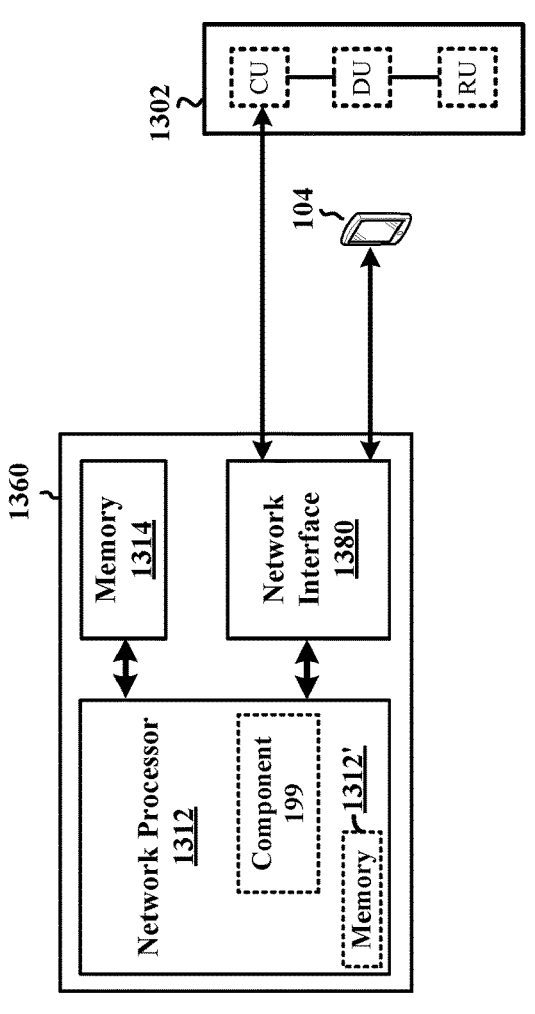
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302 and/or with the UE 104. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit at least one DL transmission, where the at least one DL transmission is associated with a first transmission power level including at least one first power characteristic. The component 199 may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The component 199 may be further configured to transmit a second indication of the at least one second power characteristic of the second transmission power level. In aspects, the component 199 may be configured to transmit, for a LMF, adjustment information, where the adjustment information includes at least one of a first range for a power level adjustment associated with the second transmission power level or a second range for a gain adjustment associated with the second transmission power level. In such aspects, the component 199 may be configured to receive, from the LMF, a request, where request indicates at least one of a first target value within the first range for the power level adjustment, a first relative adjustment value within the first range for the power level adjustment, a second target value within the second range for the gain adjustment, or a second relative adjustment value within the second range for the gain adjustment. In such aspects, the component 199 may be configured to transmit, for a network-controlled repeater (NCR), an indication of at least one of the first target value, the first relative adjustment value, the second target value, or the second relative adjustment value. In aspects, the component 199 may be configured to receive, from a LMF, a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB. In such aspects, the component 199 may be configured to transmit, for the NCR, an indication of at least one of the first target value, the first relative adjustment value, the second target value, or the second relative adjustment value. The component 199 may be further configured to perform any of the aspects described in connection with the flowcharts in any of FIGS. 9, 10, and/or any of the aspects performed by a wireless device for any of FIGS. 5-8. The component 199 may be within the processor 1312. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 may include means for transmitting at least one DL transmission, where the at least one DL transmission is associated with a first transmission power level including at least one first power characteristic. In the configuration, the network entity 1360 may include means for obtaining a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. In the configuration, the network entity 1360 may include means for transmitting a second indication of the at least one second power characteristic of the second transmission power level. In one configuration, the network entity 1360 may include means for transmitting, for a LMF, adjustment information, where the adjustment information includes at least one of a first range for a power level adjustment associated with the second transmission power level or a second range for a gain adjustment associated with the second transmission power level. In one configuration, the network entity 1360 may include means for receiving, from the LMF, a request, where request indicates at least one of a first target value within the first range for the power level adjustment, a first relative adjustment value within the first range for the power level adjustment, a second target value within the second range for the gain adjustment, or a second relative adjustment value within the second range for the gain adjustment. In the configuration, the network entity 1360 may include means for transmitting, for a network-controlled repeater (NCR), an indication of at least one of the first target value, the first relative adjustment value, the second target value, or the second relative adjustment value. In one configuration, the network entity 1360 may include means for receiving, from a LMF, a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB. In the configuration, the network entity 1360 may include means for transmitting, for the NCR, an indication of at least one of the first target value, the first relative adjustment value, the second target value, or the second relative adjustment value. The means may be the component 199 of the network entity 1360 configured to perform the functions recited by the means.

Wireless communication networks and/or wireless devices may utilize measurements associated with specific signaling to enable the determination of one or more angles of arrival, power levels of transmitted/received signals, etc., utilized for positioning operations. As one example, a network node, such as a base station, may provide DL signaling for a wireless device, such as a UE, which may respond with corresponding UL signaling that indicates the one or more angles of arrival, the power levels of transmitted/received signals, etc. Based on the received signaling, the network node, or a network entity, such as a LMF, may perform operations to determine positioning of the wireless device. However, scenarios may arise in which such signaling may not be adequate to determine an accurate positioning determination for the wireless device. For instance, a network node may communicate/exchange with a wireless device via a repeater. A repeater (e.g., a network-controlled repeater (NCR)) may be used to receive/forward positioning references for positioning of a wireless device. In some cases, such a repeater may forward DL/UL signaling between a network node and a wireless device (e.g., with no or minimal processing), and the network node is thus the logical source/destination of DL/UL signaling with respect to the wireless device. Yet, the positioning and transmission characteristics of the repeater should be considered as the repeater is the physical source/destination for positioning purposes, in such scenarios.

Aspects herein for repeater power management for positioning enable improved and more accurate positioning determinations for wireless devices. In some examples, a wireless device may be configured to receive at least one DL transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session. The wireless device may also be configured to obtain an indication of the at least one repeater power characteristic of the repeater transmission power level. In some examples, a wireless device may be configured to transmit at least one DL transmission, where the at least one DL transmission is associated with a first transmission power level including at least one first power characteristic. The first wireless device may also be configured to obtain a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session. The first wireless device may be further configured to transmit a second indication of the at least one second power characteristic of the second transmission power level.

Particular aspects of the subject matter described in this disclosure consider the power levels of signaling at, and/or positioning of, a repeater when performing a positioning session to more accurately determine positioning of wireless devices. That is, a network node and/or a network entity may be aware of the baseline (e.g., power characteristics of a repeater in the communications path, rather than the originating network node) from which the wireless device collects information for received DL signaling in view of the repeater, and more accurate positioning for the wireless device may be determined.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, including: receiving at least one downlink (DL) transmission at a reception power level, where the at least one DL transmission is associated with an initial transmission power level including at least one initial power characteristic that is different from at least one repeater power characteristic of a repeater transmission power level associated with the at least one DL transmission, where the initial transmission power level and the repeater transmission power level are associated with communication for a positioning session; and obtaining an indication of the at least one repeater power characteristic of the repeater transmission power level.

Aspect 2 is the method of aspect 1, where the indication of the at least one repeater power characteristic of the repeater transmission power level includes at least one of a first power level for a synchronization signal block (SSB) or a second power level for a positioning reference signal (PRS).

Aspect 3 is the method of aspect 2, where the indication of the at least one repeater power characteristic of the repeater transmission power level indicates at least one of a range of transmission power for the repeater transmission power level, a minimum range of transmission power for the repeater transmission power level, a maximum range of transmission power for the repeater transmission power level, a mean range of transmission power for the repeater transmission power level, or a percentile range of transmission power for the repeater transmission power level.

Aspect 4 is the method of aspect 2, where the indication of the at least one repeater power characteristic of the repeater transmission power level indicates at least one of a value of amplification gain for the repeater transmission power level, a range of amplification gain for the repeater transmission power level, a minimum range of amplification gain for the repeater transmission power level, a maximum range of amplification gain for the repeater transmission power level, a mean range of amplification gain for the repeater transmission power level, or a percentile range of amplification gain for the repeater transmission power level.

Aspect 5 is the method of any of aspects 2 to 4, where the indication of the at least one repeater power characteristic of the repeater transmission power level indicates a flag that indicates at least one of a constant power for the repeater transmission power level or a constant gain for the repeater transmission power level.

Aspect 6 is the method of any of aspects 2 to 5, where the indication of the at least one repeater power characteristic of the repeater transmission power level indicates information for a DL reference signal received power (DL-RSRP), where the information for the DL-RSRP includes at least one of a value of the DL-RSRP, a range of the DL-RSRP, a minimum value of the DL-RSRP, a maximum value of the DL-RSRP, a mean value of the DL-RSRP, or a percentile value of the DL-RSRP.

Aspect 7 is the method of aspect 6, where the information for the DL-RSRP further includes at least two instances of the information for the DL-RSRP that respectively correspond to at least two access directions associated with the DL-RSRP.

Aspect 8 is the method of any of aspects 2 to 7, where the indication of the at least one repeater power characteristic of the repeater transmission power level indicates at least one of a transmit power value or an amplification gain value that corresponds to at least one DL beam respectively associated with the at least one DL transmission.

Aspect 9 is the method of any of aspects 2 to 8, where the indication of the at least one repeater power characteristic of the repeater transmission power level indicates a constant output power for the at least one DL transmission.

Aspect 10 is the method of any of aspects 1 to 9, where receiving the at least one DL transmission includes receiving the at least one DL transmission from a network controlled repeater (NCR); and where the initial transmission power level is associated with a network node.

Aspect 11 is the method of any of aspects 1 to 10, where obtaining the indication of the at least one repeater power characteristic of the repeater transmission power level includes receiving, from a network node, the indication of the at least one repeater power characteristic of the repeater transmission power level.

Aspect 12 is a method of wireless communication at a wireless device, including: transmitting at least one downlink (DL) transmission, where the at least one DL transmission is associated with a first transmission power level including at least one first power characteristic; obtaining a first indication of a second transmission power level of the at least one DL transmission, where the second transmission power level includes at least one second power characteristic that is different from the at least one first power characteristic of the first transmission power level, where the first transmission power level and the second transmission power level are associated with communication for a positioning session; and transmitting a second indication of the at least one second power characteristic of the second transmission power level.

Aspect 13 is the method of aspect 12, where the second transmission power level is associated with a transmission of a repeater, and where the second indication of the at least one second power characteristic of the second transmission power level includes at least one of a first power level for a synchronization signal block (SSB) or a second power level for a positioning reference signal (PRS).

Aspect 14 is the method of aspect 13, where the second indication of the at least one second power characteristic of the second transmission power level indicates at least one of a range of transmission power for the second transmission power level, a minimum range of transmission power for the second transmission power level, a maximum range of transmission power for the second transmission power level, a mean range of transmission power for the second transmission power level, or a percentile range of transmission power for the second transmission power level.

Aspect 15 is the method of aspect 13, where the second indication of the at least one second power characteristic of the second transmission power level indicates at least one of a value of amplification gain for the second transmission power level, a range of amplification gain for the second transmission power level, a minimum range of amplification gain for the second transmission power level, a maximum range of amplification gain for the second transmission power level, a mean range of amplification gain for the second transmission power level, or a percentile range of amplification gain for the second transmission power level.

Aspect 16 is the method of any of aspects 13 to 15, where the second indication of the at least one second power characteristic of the second transmission power level indicates a flag that indicates at least one of a constant power for the second transmission power level or a constant gain for the second transmission power level.

Aspect 17 is the method of any of aspects 13 to 16, where the second indication of the at least one second power characteristic of the second transmission power level indicates information for a DL reference signal received power (DL-RSRP), where the information for the DL-RSRP includes at least one of a value of the DL-RSRP, a range of the DL-RSRP, a minimum value of the DL-RSRP, a maximum value of the DL-RSRP, a mean value of the DL-RSRP, or a percentile value of the DL-RSRP.

Aspect 18 is the method of aspect 17, where the information for the DL-RSRP further includes at least two instances of the information for the DL-RSRP that respectively correspond to at least two access directions associated with the DL-RSRP.

Aspect 19 is the method of any of aspects 13 to 18, where the second indication of the at least one second power characteristic of the second transmission power level indicates at least one of a transmit power value or an amplification gain value that corresponds to at least one DL beam respectively associated with the at least one DL transmission.

Aspect 20 is the method of any of aspects 13 to 19, where the second indication of the at least one second power characteristic of the second transmission power level indicates a constant output power for the at least one DL transmission.

Aspect 21 is the method of any of aspects 13 to 20, where transmitting the at least one DL transmission includes transmitting the at least one DL transmission for a network controlled repeater (NCR), and where the wireless device is a network node.

Aspect 22 is the method of aspect 21, further including: transmitting, for a location management function (LMF), adjustment information, where the adjustment information includes at least one of a first range for a power level adjustment associated with the second transmission power level or a second range for a gain adjustment associated with the second transmission power level; receiving, from the LMF, a request, where the request indicates at least one of a first target value within the first range for the power level adjustment, a first relative adjustment value within the first range for the power level adjustment, a second target value within the second range for the gain adjustment, or a second relative adjustment value within the second range for the gain adjustment; and transmitting, for the NCR, an indication of at least one of the first target value, the first relative adjustment value, the second target value, or the second relative adjustment value.

Aspect 23 is the method of aspect 22, where transmitting the adjustment information includes transmitting the adjustment information with transmission-reception power information; and where receiving the request includes receiving a positioning reference signal (PRS) configuration request with DL PRS transmission characteristics.

Aspect 24 is the method of aspect 21, further including: receiving, from a location management function (LMF), a positioning information request, where the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB; and transmitting, for the NCR, an indication of at least one of the first target value, the first relative adjustment value, the second target value, or the second relative adjustment value.

Aspect 25 is the method of any of aspects 12 to 24, where obtaining the first indication of the second transmission power level of the at least one DL transmission includes receiving, from a repeater, the first indication of the second transmission power level of the at least one DL transmission; or obtaining the first indication of the second transmission power level of the at least one DL transmission includes configuring the first indication of the second transmission power level of the at least one DL transmission.

Aspect 26 is an apparatus for wireless communication including means for implementing any of aspects 1 to 11.

Aspect 27 is a computer-readable medium (e.g., a nontransitory computer-readable medium) storing computer executable code, the code when executed by at least one processor causes the at least one processor to implement any of aspects 1 to 11.

Aspect 28 is an apparatus for wireless communication at a network node. The apparatus includes a memory; and at least one processor coupled to the memory and, based at least in part on information stored in the memory, the at least one processor is configured to implement any of aspects 1 to 11.

Aspect 29 is the apparatus of aspect 28, further including at least one of a transceiver or an antenna coupled to the at least one processor.

Aspect 30 is an apparatus for wireless communication including means for implementing any of aspects 12 to 25.

Aspect 31 is a computer-readable medium (e.g., a nontransitory computer-readable medium) storing computer executable code, the code when executed by at least one processor causes the at least one processor to implement any of aspects 16 to 25.

Aspect 32 is an apparatus for wireless communication at a network node. The apparatus includes a memory; and at least one processor coupled to the memory and, based at least in part on information stored in the memory, the at least one processor is configured to implement any of aspects 16 to 25.

Aspect 33 is the apparatus of aspect 32, further including at least one of a transceiver or an antenna coupled to the at least one processor.

Aspect 34 is a method of wireless communication at a first wireless device, including: receiving at least one transmission, where the at least one transmission is associated with a first transmission power level; transmitting the at least one transmission at a second transmission power level, where the second transmission power level has at least one power characteristic that is different from the first transmission power level; and obtaining an indication of the at least one power characteristic of the second transmission power level.

Aspect 35 is the method of aspect 34, where transmitting the at least one transmission at the second transmission power level includes: forwarding the at least one transmission at the second transmission power level.

Aspect 36 is the method of aspect 35, where forwarding the at least one transmission at the second transmission power level includes: forwarding, from a second wireless device to a third wireless device, the at least one transmission at the second transmission power level.

Aspect 37 is the method of aspect 36, where the first wireless device is a repeater or a repeating device, where the second wireless device is at least one of a second user equipment (UE), a second network node, or a second network entity, and where the third wireless device is at least one of a third UE, a third network node, or a third network entity.

Aspect 38 is the method of any of aspects 34 to 37, where the indication of the at least one power characteristic of the second transmission power level includes at least one of a transmission power for a synchronization signal block (SSB), a transmission power for a positioning reference signal (PRS), or a transmission power for a sounding reference signal (SRS).

Aspect 39 is the method of any of aspects 34 to 38, where receiving the at least one transmission includes receiving at least one downlink (DL) transmission from a network node; where transmitting the at least one transmission includes transmitting the at least one DL transmission for a user equipment (UE); or where the method further includes: transmitting the indication to at least one of the network node or a location management function (LMF) node.

Aspect 40 is the method of any of aspects 34 to 39, where receiving the at least one transmission includes receiving at least one sidelink (SL) transmission or receiving at least one uplink (UL) transmission.

Aspect 41 is an apparatus for wireless communication including means for implementing any of aspects 34 to 40.

Aspect 42 is a computer-readable medium (e.g., a nontransitory computer-readable medium) storing computer executable code, the code when executed by at least one processor causes the at least one processor to implement any of aspects 34 to 40.

Aspect 43 is an apparatus for wireless communication at a network node. The apparatus includes a memory; and at least one processor coupled to the memory and, based at least in part on information stored in the memory, the at least one processor is configured to implement any of aspects 34 to 40.

Aspect 44 is the apparatus of aspect 43, further including at least one of a transceiver or an antenna coupled to the at least one processor.

43

44

What is claimed is:

1. An apparatus for wireless communication at a wireless device, comprising:

memory; and at least one processor coupled to the memory and, based at least in part on information stored in the memory, the at least one processor is configured to:

receive at least one downlink (DL) transmission at a reception power level, wherein the at least one DL transmission is associated with an initial transmission power level including at least one initial power characteristic that is different from at least one repeater power characteristic of a repeater transmission power level associated with the at least one DL transmission, wherein the initial transmission power level and the repeater transmission power level are associated with communication for a positioning session; and obtain an indication of the at least one repeater power characteristic of the repeater transmission power level, wherein the indication is associated with an uplink transmission thereof subsequent to obtainment of the indication.

2. The apparatus of claim 1, wherein the indication of the at least one repeater power characteristic of the repeater transmission power level includes at least one of a first power level for a synchronization signal block (SSB) or a second power level for a positioning reference signal (PRS).

3. The apparatus of claim 2, wherein the indication of the at least one repeater power characteristic of the repeater transmission power level indicates at least one of a range of transmission power for the repeater transmission power level, a minimum range of transmission power for the repeater transmission power level, a maximum range of transmission power for the repeater transmission power level, a mean range of transmission power for the repeater transmission power level, or a percentile range of transmission power for the repeater transmission power level.

4. The apparatus of claim 2, wherein the indication of the at least one repeater power characteristic of the repeater transmission power level indicates at least one of a value of amplification gain for the repeater transmission power level, a range of amplification gain for the repeater transmission power level, a minimum range of amplification gain for the repeater transmission power level, a maximum range of amplification gain for the repeater transmission power level, a mean range of amplification gain for the repeater transmission power level, or a percentile range of amplification gain for the repeater transmission power level.

5. The apparatus of claim 2, wherein the indication of the at least one repeater power characteristic of the repeater transmission power level indicates a flag that indicates at least one of a constant power for the repeater transmission power level or a constant gain for the repeater transmission power level.

6. The apparatus of claim 2, wherein the indication of the at least one repeater power characteristic of the repeater transmission power level indicates information for a DL reference signal received power (DL-RSRP), wherein the information for the DL-RSRP includes at least one of a value of the DL-RSRP, a range of the DL-RSRP, a minimum value of the DL-RSRP, a maximum value of the DL-RSRP, a mean value of the DL-RSRP, or a percentile value of the DL-RSRP.

7. The apparatus of claim 6, wherein the information for the DL-RSRP further includes at least two instances of the information for the DL-RSRP that respectively correspond to at least two access directions associated with the DL-RSRP.

8. The apparatus of claim 2, wherein the indication of the at least one repeater power characteristic of the repeater transmission power level indicates at least one of a transmit power value or an amplification gain value that corresponds to at least one DL beam respectively associated with the at least one DL transmission.

9. The apparatus of claim 2, wherein the indication of the at least one repeater power characteristic of the repeater transmission power level indicates a constant output power for the at least one DL transmission.

10. The apparatus of claim 1, wherein to receive the at least one DL transmission, the at least one processor is configured to receive the at least one DL transmission from a network controlled repeater (NCR); and wherein the initial transmission power level is associated with a network node.

11. The apparatus of claim 1, wherein to obtain the indication of the at least one repeater power characteristic of the repeater transmission power level, the at least one processor is configured to receive, from a network node, the indication of the at least one repeater power characteristic of the repeater transmission power level.

12. An apparatus for wireless communication at a wireless device, comprising:

memory; and at least one processor coupled to the memory and, based at least in part on information stored in the memory, the at least one processor is configured to:

transmit at least one downlink (DL) transmission, wherein the at least one DL transmission is associated with a first transmission power level including at least one first power characteristic;

obtain a first indication of a second transmission power level of the at least one DL transmission, wherein the second transmission power level includes at least one second power characteristic that is different from the at least one first power characteristic of the first transmission power level, wherein the first transmission power level and the second transmission power level are associated with communication for a positioning session; and transmit a second indication of the at least one second power characteristic of the second transmission power level.

13. The apparatus of claim 12, wherein the second transmission power level is associated with a transmission of a repeater, and wherein the second indication of the at least one second power characteristic of the second transmission power level includes at least one of a first power level for a synchronization signal block (SSB) or a second power level for a positioning reference signal (PRS).

14. The apparatus of claim 13, wherein the second indication of the at least one second power characteristic of the second transmission power level indicates at least one of a range of transmission power for the second transmission power level, a minimum range of transmission power for the second transmission power level, a maximum range of transmission power for the second transmission power level, a mean range of transmission power for the second transmission power level, or a percentile range of transmission power for the second transmission power level.

15. The apparatus of claim 13, wherein the second indication of the at least one second power characteristic of the second transmission power level indicates at least one of a value of amplification gain for the second transmission power level, a range of amplification gain for the second transmission power level, a minimum range of amplification gain for the second transmission power level, a maximum range of amplification gain for the second transmission power level, a mean range of amplification gain for the second transmission power level, or a percentile range of amplification gain for the second transmission power level.

16. The apparatus of claim 13, wherein the second indication of the at least one second power characteristic of the second transmission power level indicates a flag that indicates at least one of a constant power for the second transmission power level or a constant gain for the second transmission power level.

17. The apparatus of claim 13, wherein the second indication of the at least one second power characteristic of the second transmission power level indicates information for a DL reference signal received power (DL-RSRP), wherein the information for the DL-RSRP includes at least one of a value of the DL-RSRP, a range of the DL-RSRP, a minimum value of the DL-RSRP, a maximum value of the DL-RSRP, a mean value of the DL-RSRP, or a percentile value of the DL-RSRP.

18. The apparatus of claim 17, wherein the information for the DL-RSRP further includes at least two instances of the information for the DL-RSRP that respectively correspond to at least two access directions associated with the DL-RSRP.

19. The apparatus of claim 13, wherein the second indication of the at least one second power characteristic of the second transmission power level indicates at least one of a transmit power value or an amplification gain value that corresponds to at least one DL beam respectively associated with the at least one DL transmission.

20. The apparatus of claim 13, wherein the second indication of the at least one second power characteristic of the second transmission power level indicates a constant output power for the at least one DL transmission.

21. The apparatus of claim 12, wherein to transmit the at least one DL transmission, the at least one processor is configured to transmit the at least one DL transmission for a network controlled repeater (NCR); and
wherein the wireless device is a network node.

22. The apparatus of claim 21, wherein the at least one processor is further configured to:
transmit, for a location management function (LMF), adjustment information, wherein the adjustment information includes at least one of a first range for a power level adjustment associated with the second transmission power level or a second range for a gain adjustment associated with the second transmission power level;
receive, from the LMF, a request, wherein the request indicates at least one of a first target value within the first range for the power level adjustment, a first relative adjustment value within the first range for the power level adjustment, a second target value within the second range for the gain adjustment, or a second relative adjustment value within the second range for the gain adjustment; and
transmit, for the NCR, an indication of at least one of the first target value, the first relative adjustment value, the second target value, or the second relative adjustment value.

23. The apparatus of claim 22, wherein to transmit the adjustment information, the at least one processor is configured to transmit the adjustment information with transmission-reception power information; and
wherein to receive the request, the at least one processor is configured to receive a positioning reference signal (PRS) configuration request with DL PRS transmission characteristics.

24. The apparatus of claim 21, wherein the at least one processor is further configured to:
receive, from a location management function (LMF), a positioning information request, wherein the positioning information request indicates requested transmission characteristics associated with at least one synchronization signal block (SSB) including at least one of a first target value of a power level adjustment for the at least one SSB, a first relative adjustment value of the power level adjustment for the at least one SSB, a second target value of a gain adjustment for the at least one SSB, or a second relative adjustment value of the gain adjustment for the at least one SSB; and
transmit, for the NCR, an indication of at least one of the first target value, the first relative adjustment value, the second target value, or the second relative adjustment value.

25. The apparatus of claim 12, wherein to obtain the first indication of the second transmission power level of the at least one DL transmission, the at least one processor is configured to receive, from a repeater, the first indication of the second transmission power level of the at least one DL transmission; or
wherein to obtain the first indication of the second transmission power level of the at least one DL transmission, the at least one processor is configured to configure the first indication of the second transmission power level of the at least one DL transmission.

26. A method of wireless communication at a wireless device, comprising:
receiving at least one downlink (DL) transmission at a reception power level, wherein the at least one DL transmission is associated with an initial transmission power level including at least one initial power characteristic that is different from at least one repeater power characteristic of a repeater transmission power level associated with the at least one DL transmission, wherein the initial transmission power level and the repeater transmission power level are associated with communication for a positioning session; and
obtaining an indication of the at least one repeater power characteristic of the repeater transmission power level, wherein the indication is associated with an uplink transmission thereof subsequent to obtainment of the indication.

27. The method of claim 26, wherein the indication of the at least one repeater power characteristic of the repeater transmission power level includes at least one of a first power level for a synchronization signal block (SSB) or a second power level for a positioning reference signal (PRS).

28. The method of claim 27, wherein the indication of the at least one repeater power characteristic of the repeater transmission power level indicates at least one of a range of transmission power for the repeater transmission power level, a minimum range of transmission power for the repeater transmission power level, a maximum range of transmission power for the repeater transmission power level, a mean range of transmission power for the repeater transmission power level, or a percentile range of transmission power for the repeater transmission power level;

wherein the indication of the at least one repeater power characteristic of the repeater transmission power level indicates at least one of a value of amplification gain for the repeater transmission power level, a range of amplification gain for the repeater transmission power level, a minimum range of amplification gain for the repeater transmission power level, a maximum range of amplification gain for the repeater transmission power level, a mean range of amplification gain for the repeater transmission power level, or a percentile range of amplification gain for the repeater transmission power level;

wherein the indication of the at least one repeater power characteristic of the repeater transmission power level indicates a flag that indicates at least one of a constant power for the repeater transmission power level or a constant gain for the repeater transmission power level;

wherein the indication of the at least one repeater power characteristic of the repeater transmission power level indicates information for a DL reference signal received power (DL-RSRP), wherein the information for the DL-RSRP includes at least one of a value of the DL-RSRP, a range of the DL-RSRP, a minimum value of the DL-RSRP, a maximum value of the DL-RSRP, a mean value of the DL-RSRP, or a percentile value of the DL-RSRP;

wherein the indication of the at least one repeater power characteristic of the repeater transmission power level indicates at least one of a transmit power value or an amplification gain value that corresponds to at least one DL beam respectively associated with the at least one DL transmission; or wherein the indication of the at least one repeater power characteristic of the repeater transmission power level indicates a constant output power for the at least one DL transmission.

29. The method of claim 26, wherein obtaining the indication of the at least one repeater power characteristic of the repeater transmission power level comprises receiving, from a network node, the indication of the at least one repeater power characteristic of the repeater transmission power level.

30. A method of wireless communication at a wireless device, comprising:

transmitting at least one downlink (DL) transmission, wherein the at least one DL transmission is associated with a first transmission power level including at least one first power characteristic;

obtaining a first indication of a second transmission power level of the at least one DL transmission, wherein the second transmission power level includes at least one second power characteristic that is different from the at least one first power characteristic of the first transmission power level, wherein the first transmission power level and the second transmission power level are associated with communication for a positioning session; and transmitting a second indication of the at least one second power characteristic of the second transmission power level.

* * * * *